United States Patent
Luo et al.

(10) Patent No.: US 11,716,775 B2
(45) Date of Patent: Aug. 1, 2023

(54) SOFT PHYSICAL CELL IDENTIFIER (PCI) CHANGE

(71) Applicant: QUALCOMM Incorporated, San Diego, CA (US)

(72) Inventors: Jianghong Luo, Skillman, NJ (US); Junyi Li, Chester, NJ (US); Karl Georg Hampel, Hoboken, NJ (US); Navid Abedini, Somerset, NJ (US); Tao Luo, San Diego, CA (US); Luca Blessent, Whitehouse Station, NJ (US); Naeem Akl, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 16/987,261

(22) Filed: Aug. 6, 2020

(65) Prior Publication Data

US 2021/0045170 A1 Feb. 11, 2021

Related U.S. Application Data

(60) Provisional application No. 62/885,151, filed on Aug. 9, 2019.

(51) Int. Cl.
*H04W 76/11* (2018.01)
*H04W 36/04* (2009.01)
(Continued)

(52) U.S. Cl.
CPC .......... *H04W 76/11* (2018.02); *H04L 5/0051* (2013.01); *H04W 24/08* (2013.01); *H04W 24/10* (2013.01);
(Continued)

(58) Field of Classification Search
None
See application file for complete search history.

(56) References Cited

U.S. PATENT DOCUMENTS

| 2017/0238243 | A1* | 8/2017 | Park | H04W 72/23 |
| | | | | 455/434 |
| 2019/0208487 | A1 | 7/2019 | Iijima et al. | |

(Continued)

FOREIGN PATENT DOCUMENTS

| EP | 2549825 A1 | 1/2013 |
| EP | 2836014 A1 | 2/2015 |

(Continued)

OTHER PUBLICATIONS

Ericsson: "Network Identities for Non-Terrestrial Networks", 3GPP Draft, 3GPP TSG-RAN WG3 #103, R3-191026_WAS_0810, 3rd Generation Partnership Project (3GPP), Mobile Competence Centre, 650, Route Des-ucioles, F-06921 Sophia-Antipolis Cedex, France, vol. RAN WG3, No. Athens, Greece, Feb. 25, 2019-Mar. 1, 2019, Mar. 4, 2019 (Mar. 4, 2019), XP051694500, 3 Pages, Retrieved from the Internet: URL: http://www.3gpp.org/ftp/tsg%5Fran/WG3%5Flu/TSGR3%5F103/Docs/R3%2D191026%2Ezip [retrieved on Mar. 4, 2019] The Whole Document.

(Continued)

*Primary Examiner* — Scott M Sciacca
(74) *Attorney, Agent, or Firm* — Loza & Loza, LLP

(57) ABSTRACT

Aspects relate to a soft physical cell identifier (PCI) change within a wireless network. A scheduling entity may communicate with a set of one or more scheduled entities within a first cell utilizing a first PCI. The scheduling entity may determine that a second PCI of a second cell co-located with the first cell has been assigned to the scheduling entity, for example, as a result of a PCI collision. The scheduling entity may implement a soft PCI change from the first PCI to the second PCI during a transition period within which the set (Continued)

of one or more scheduled entities may be transferred from the first cell to the second cell. The scheduling entity may then discontinue using the first PCI after completion of the transition period.

28 Claims, 19 Drawing Sheets

(51) Int. Cl.
| | |
|---|---|
| H04W 36/18 | (2009.01) |
| H04W 36/24 | (2009.01) |
| H04W 72/1263 | (2023.01) |
| H04W 76/28 | (2018.01) |
| H04W 56/00 | (2009.01) |
| H04L 5/00 | (2006.01) |
| H04W 24/08 | (2009.01) |
| H04W 88/14 | (2009.01) |
| H04W 76/27 | (2018.01) |
| H04W 24/10 | (2009.01) |
| H04W 74/08 | (2009.01) |

(52) U.S. Cl.
CPC ..... *H04W 56/001* (2013.01); *H04W 72/1263* (2013.01); *H04W 74/0833* (2013.01); *H04W 76/27* (2018.02); *H04W 76/28* (2018.02); *H04W 88/14* (2013.01)

(56) References Cited

U.S. PATENT DOCUMENTS

| | | | |
|---|---|---|---|
| 2020/0196207 A1* | 6/2020 | Zhang | H04W 16/14 |
| 2020/0205047 A1* | 6/2020 | Bergqvist | H04W 36/08 |
| 2021/0377821 A1* | 12/2021 | Shi | H04W 24/02 |
| 2021/0409978 A1* | 12/2021 | Mackenzie | H04W 36/24 |
| 2022/0264620 A1* | 8/2022 | Teyeb | H04W 72/1284 |

FOREIGN PATENT DOCUMENTS

| | | | |
|---|---|---|---|
| WO | 2017204741 A1 | 11/2017 | |
| WO | WO-2020205552 A1 * | 10/2020 | H04J 11/0073 |

OTHER PUBLICATIONS

Huawei:"The Neighbour cells Management in NTN", 3GPP Draft, 3GPP TSG-RAN WG3 Meeting #104, R3-193212_Neighbor_NTN_R1, 3rd Generation Partnership Project (3GPP), Mobile Competence Centre, 650, Route Des Lucioles, F-06921 Sophia-Antipolis Cedex, France, vol. RAN WG3, No. Reno, Nevada, US, May 13, 2019-May 17, 2019, May 21, 2019 (May 21, 2019), XP051740772, 5 Pages, Retrieved from the Internet: URL: http://www.3gpp.org/ftp/tsg%5Fran/WG3%5Fiu/TSGR3%5F104/Docs/R3%2D193212%2Ezip [retrieved on May 21, 2019] The Whole Document.
International Search Report and Written Opinion—PCT/US2020/045394—ISA/EPO—dated Oct. 26, 2020.

* cited by examiner

SOFT PHYSICAL CELL IDENTIFIER (PCI) CHANGE

CROSS-REFERENCE TO RELATED APPLICATIONS

The present Application for Patent claims priority to and the benefit of pending U.S. Provisional Application No. 62/885,151, titled "SOFT PHYSICAL CELL IDENTIFIER (PCI) CHANGE" filed Aug. 9, 2019, and assigned to the assignee hereof and hereby expressly incorporated by reference herein as if fully set forth below in its entirety and for all applicable purposes.

TECHNICAL FIELD

The technology discussed below relates generally to wireless communication systems, and more particularly, to techniques for implementing a soft physical cell identifier (PCI) change in wireless networks.

INTRODUCTION

In wireless networks, a cell may be identified by a physical cell identifier (PCI). The PCI may be carried in a primary synchronization signal (PSS) and secondary synchronization signal (SSS) of a synchronization signal block (SSB). In addition, the PCI may be used to determine scrambling sequences of various physical signals or channels, such as the physical broadcast channel (PBCH), physical downlink control channel (PDCCH) CoreSet0, and cell-specific physical downlink shared channel (PDSCH) transmissions.

In some networks, two neighboring cells may be assigned the same PCI, which may result in a PCI collision. For example, in Integrated-Access-Backhaul (IAB) networks that utilize wireless spectrum for both access links (links to user equipment (UEs)) and backhaul links (links to the core network), neighboring IAB nodes (e.g., base stations) may be assigned the same PCI as a result of mobile IAB nodes or zero-network planning. When two neighboring cells have the same PCI, a UE may not be able to differentiate reference signals from each of the neighboring cells. In addition, a PCI collision between two neighboring cells may lead to timing synchronization and channel estimation issues at the UE, and may further result in decoding failure of user data traffic transmitted from one of the two neighboring cells.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication at a scheduling entity is disclosed. The method includes communicating with a set of one or more scheduled entities utilizing a first physical cell identifier (PCI) of a first cell served by the scheduling entity and identifying a second PCI of a second cell served by the scheduling entity. The first cell and the second cell can be co-located. The method further includes transferring at least one scheduled entity of the set of one or more scheduled entities from the first cell to the second cell during a transition period, and discontinuing communication with the set of one or more scheduled entities in the first cell after the transition period.

Another example provides a scheduling entity within a wireless communication network including a transceiver, a memory, and a processor communicatively coupled to the transceiver and memory. The processor and the memory can be configured to communicate with a set of one or more scheduled entities utilizing a first physical cell identifier (PCI) of a first cell served by the scheduling entity and identify a second PCI of a second cell served by the scheduling entity. The first cell and the second cell can be co-located. The processor and the memory can further be configured to transfer at least one scheduled entity of the set of one or more scheduled entities from the first cell to the second cell during a transition period, and discontinue communication with the set of one or more scheduled entities in the first cell after the transition period.

Another example provides a scheduling entity within a wireless communication network. The scheduling entity includes means for communicating with a set of one or more scheduled entities utilizing a first physical cell identifier (PCI) of a first cell served by the scheduling entity and means for identifying a second PCI of a second cell served by the scheduling entity. The first cell and the second cell can be co-located. The scheduling entity further includes means for transferring at least one scheduled entity of the set of one or more scheduled entities from the first cell to the second cell during a transition period, and means for discontinuing communication with the set of one or more scheduled entities in the first cell after the transition period.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
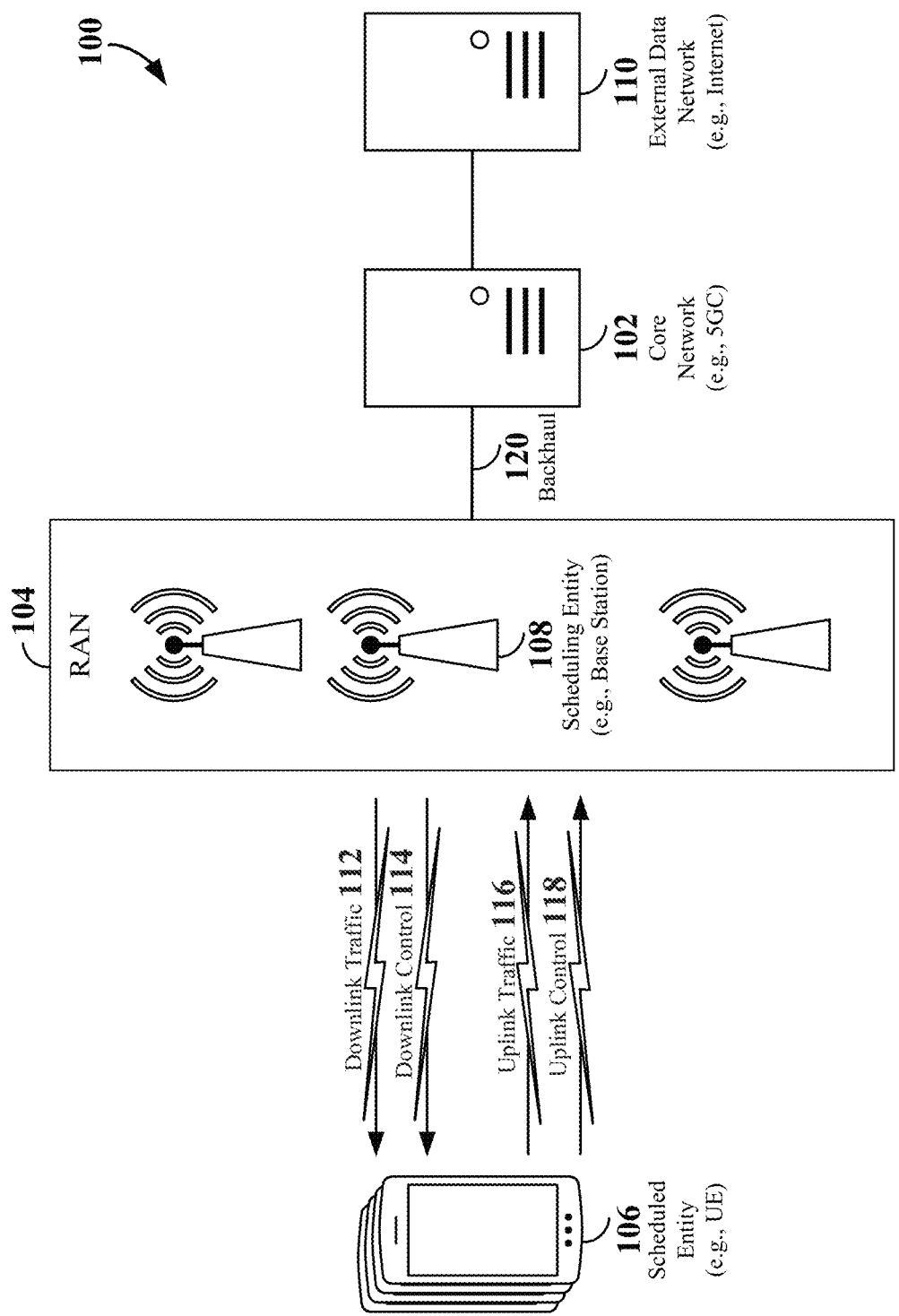
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the present disclosure relate to facilitating a soft PCI change within a wireless network. A scheduling entity, such as a base station or IAB node, may communicate with a set of one or more scheduled entities, such as UEs or other IAB nodes, within a first cell utilizing a first PCI. The scheduling entity may determine that a second PCI of a second cell co-located with the first cell has been assigned to the scheduling entity, for example, as a result of a PCI collision. The scheduling entity may implement a soft PCI change from the first PCI to the second PCI during a transition period within which the set of one or more scheduled entities may be transferred from the first cell to the second cell. The scheduling entity may then discontinue communicating in the first cell with the first PCI after completion of the transition period.

In some examples, the second cell with the second PCI may operate fully or partially as an individual cell during the transition period. For example, the scheduling entity may transmit synchronization signal blocks (SSBs) within both the first cell and the second cell during the transition period. In some examples, the SSBs between the first and second cells are separated in one or more of a frequency domain, time domain, or a code domain. The scheduling entity may further allocate orthogonal resources between the first and second cells during the transition period to communicate with the set of one or more scheduled entities. In some examples, the scheduling entity may utilize a physical random access channel (PRACH) configuration of the first cell in the second cell and discontinue monitoring the PRACH in the first cell during the transition period. The scheduling entity may further utilize different power levels in the first and second cells during the transition period.

In some examples, the scheduling entity may autonomously initiate the soft PCI change. In other examples, the scheduling entity may receive a message from a network node indicating the scheduling entity should perform the soft PCI change. For example, the network node may include a centralized network node, such as another IAB node or other central network entity.

In some examples, the scheduling entity may transfer a radio resource control (RRC)-connected scheduled entity of the set of scheduled entities from the first cell to the second cell by performing a handover of the RRC-connected scheduled entity from the first cell to the second cell. The handover may be initiated by the centralized network node or by the scheduling entity. In some examples, the handover may be initiated without configuration of handover measurements or receipt of a handover report from the RRC-connected scheduled entity. In other examples, the handover measurement can be configured using a beam direction corresponding to a latest serving beam direction utilized in the first cell for the RRC-connected scheduled entity. In some examples, the handover may be implemented using physical random access channel (PRACH) resources in the second cell that are associated with a beam direction corresponding to the latest serving beam direction.

In some examples, the scheduling entity may transfer a camped scheduled entity (e.g., an idle or inactive scheduled entity) of the set of one or more scheduled entities from the first cell to the second cell by updating system information with a cell bar indication for the first cell. The scheduling entity may then page the camped scheduled entity to notify the camped scheduled entity of the updated system information to enable the camped scheduled entity to select and camp onto the second cell.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable radio access technology (RAT) or RATs to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
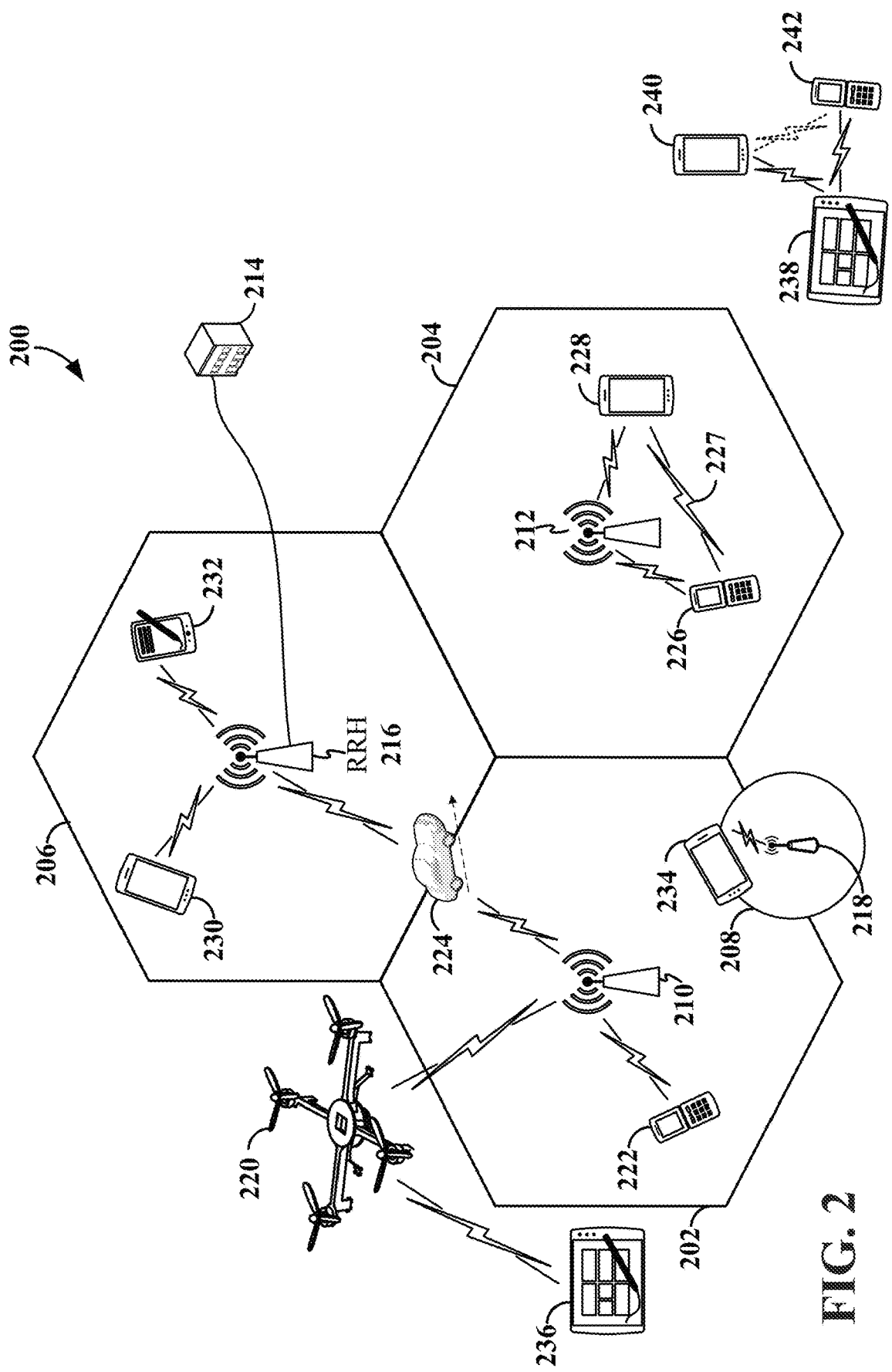
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g,. a physical sidelink shared channel) and sidelink control (e.g., a physical sidelink control channel).

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
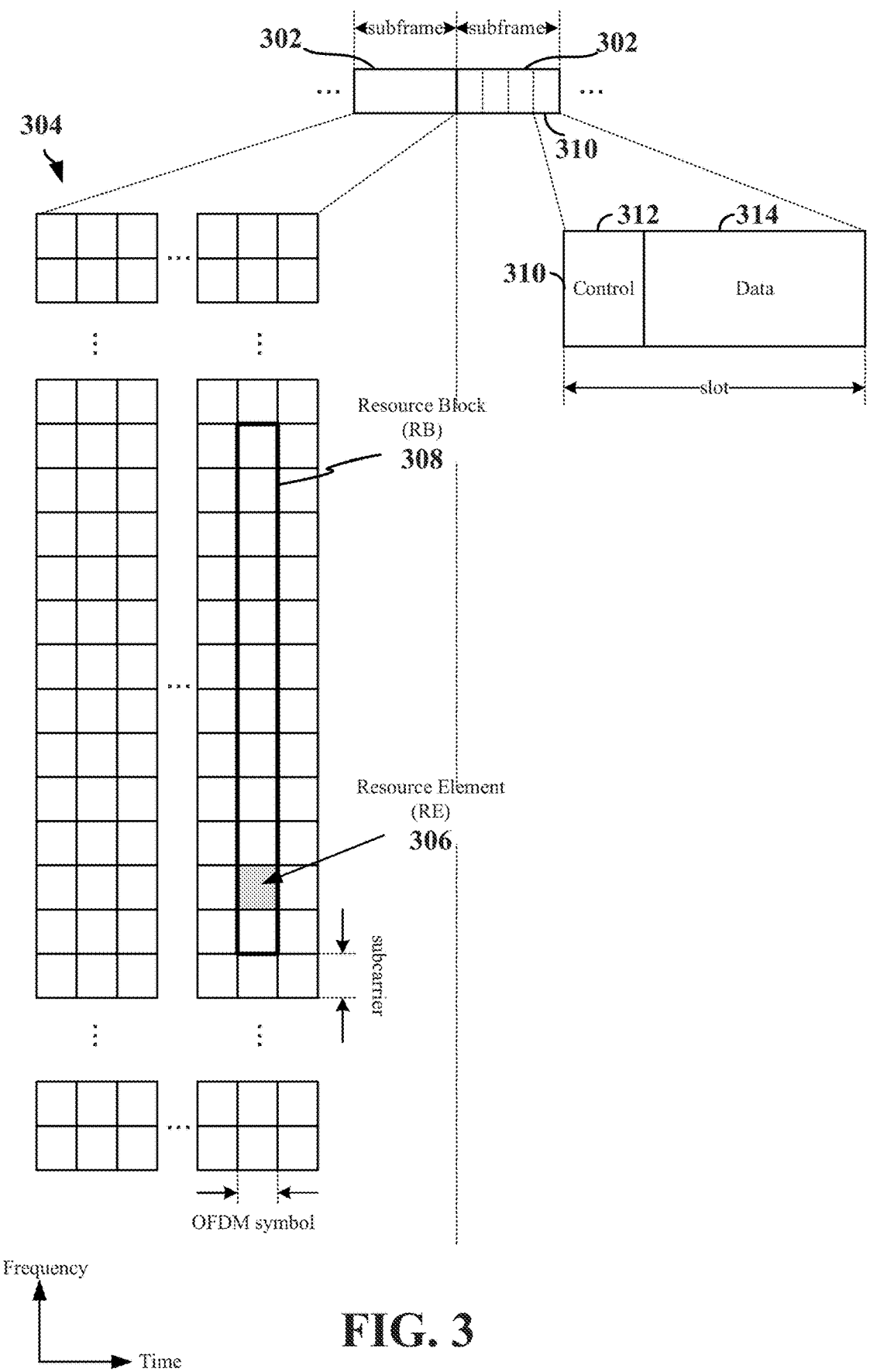
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH; a physical control format indicator channel (PCFICH); a physical hybrid automatic repeat request (HARQ) indicator channel (PHICH); and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information—reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 4 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration.

Other nonlimiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The PBCH may further include a master information block (MIB) that includes various system information, along with parameters for decoding a system information block (SIB). The SIB may be, for example, a SystemInformation-Type1 (SIB1) that may include various additional system information. Examples of system information may include, but are not limited to, subcarrier spacing, system frame number, cell bar indication, a list of common control resource sets (CoreSets) (e.g., PDCCH CoreSet® or CoreSet1), a list of common search spaces, a search space for SIB1, a paging search space, a random access search space, and uplink configuration information.

The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
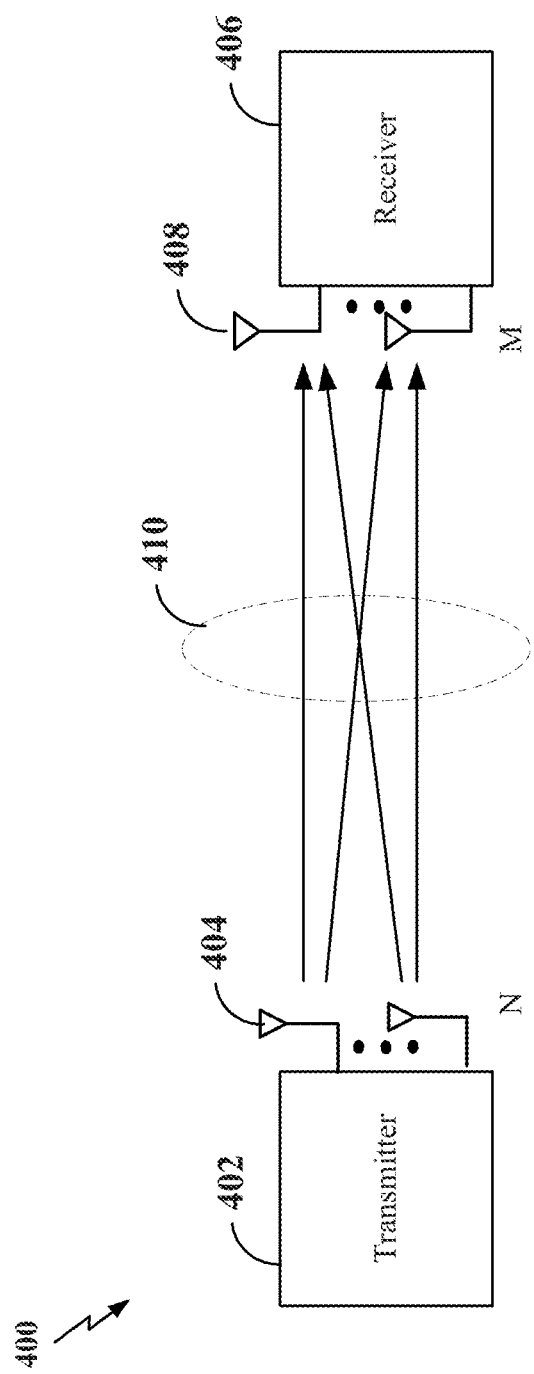
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feedback the CQI and RI values to the base station for use in updating the rank and assigning REs for future downlink transmissions.

In the simplest case, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

Figure 5:
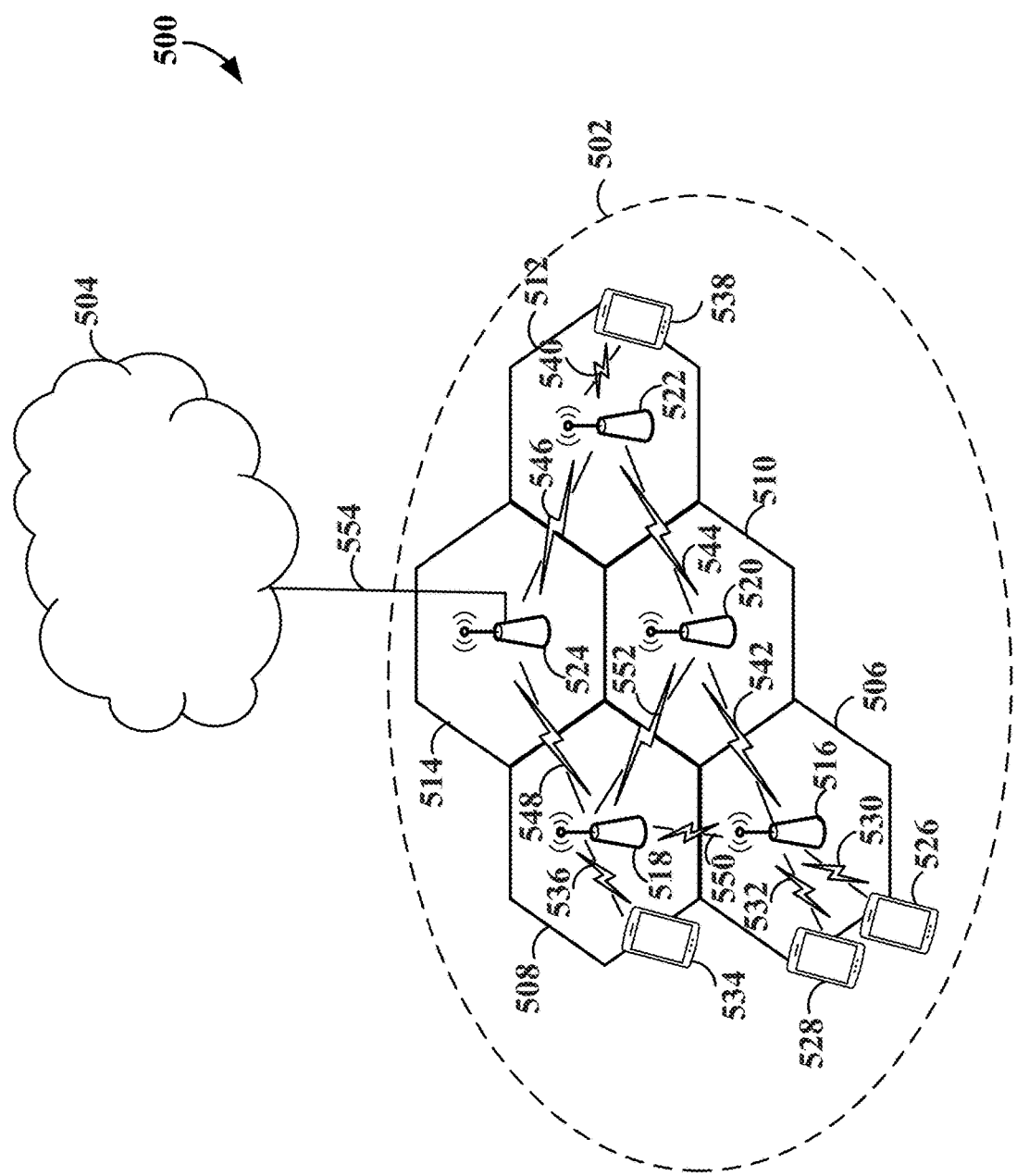
FIG. 5 is a diagram providing a high-level illustration of one example of a network configuration including an Integrated-Access-Backhaul (IAB) network according to some aspects.

Beamforming may be utilized not only within an access network (e.g., between a base station and a UE), but also within an Integrated-Access-Backhaul (IAB) network. FIG. 5 is a schematic diagram providing a high-level illustration of one example of an Integrated-Access-Backhaul (IAB) network configuration 500 that may be utilized in some aspects of the disclosure. In this illustration, a communication network 502, such as an IAB network, is coupled to a remote network 504, such as a main backhaul network or mobile core network. In such an IAB network 502, the wireless spectrum may be used for both access links and backhaul links.

The IAB network 502 may be similar to the radio access network 200 shown in FIG. 2, in that the IAB network 502 may be divided into a number cells 506, 508, 510, 512, and 514, each of which may be served by a respective IAB node 516, 518, 520, 522, and 524. Each of the IAB nodes 516-524 may be an access point, base station (BS), eNB, gNB, or other node that utilizes wireless spectrum (e.g., the radio frequency (RF) spectrum) to support access for one or more UEs located within the cells 506-514 served by the IAB nodes. Each cell 506, 508, 510, 512, and 514 is assigned a respective physical cell identifier (PCI), which is used to identify the respective cell in the IAB network 502. In 5G (New Radio) systems, there are 1008 supported values for the PCI. The PCI may be reused by multiple geographically separated cells in the IAB network 502. In this example, cells with the same PCI may be distinguished by their unique cell global identifier (NCGI).

In the example shown in FIG. 5, IAB node 516 communicates with UEs 526 and 528 via wireless access links 530 and 532, IAB node 518 communicates with UE 534 via wireless access link 536, and IAB node 522 communicates with UE 538 via wireless access link 540. The IAB nodes 516-524 are further interconnected via one or more wireless backhaul links 542, 544, 546, 548, 550, and 552. Each of the wireless backhaul links 542-552 may utilize the same wireless spectrum (e.g., the radio frequency (RF) spectrum) as the access links 530-540 to backhaul access traffic to/from the remote network 504. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any number of IAB nodes to form the IAB network 502.

In the example shown in FIG. 5, IAB node 516 communicates with IAB node 520 via wireless backhaul link 542, IAB node 520 communicates with IAB node 522 via wireless backhaul link 544, IAB node 522 communicates with IAB node 524 via wireless backhaul link 546, IAB node 524 communicates with IAB node 518 via wireless backhaul link 548, IAB node 518 communicates with IAB node 516 via wireless backhaul link 550, and IAB node 518 communicates with IAB node 520 via wireless backhaul link 552. As shown in FIG. 5, each IAB node 516-524 may be connected via respective wireless backhaul links 542-552 to two or more other IAB nodes for robustness.

Some or all of the IAB nodes 516-524 may also be connected via wired backhaul links (e.g., fiber, coaxial cable, Ethernet, copper wires, etc.) and/or microwave backhaul links. Thus, the IAB network 502 may support both wired/microwave and wireless backhaul traffic. At least one of the IAB nodes (e.g., IAB node 524) may be a border IAB node that also provides a communication link 554 to the remote network 504. For example, the border IAB node 524 may include a wired (e.g., fiber, coaxial cable, Ethernet, copper wires), microwave, or other suitable link 554 to the remote network 504.

To facilitate wireless communication between the IAB nodes 516-524 and between the IAB nodes 516-524 and the UEs served by the IAB nodes 516-524, each IAB node 516-524 may be configured to operate as both a scheduling entity and a scheduled entity. Thus, an IAB node (e.g., IAB node 516) may utilize the same wireless spectrum (e.g., the radio frequency (RF) spectrum) to transmit access traffic to/from UEs and to then backhaul that access traffic to/from the remote network 504. For example, to backhaul access traffic to/from IAB node 518, IAB node 518 may communicate with IAB node 520 to transmit backhaul access traffic via wireless backhaul link 552, IAB node 520 may communicate with IAB node 522 to transmit the backhaul access traffic via wireless backhaul link 544, and IAB node 522 may communicate with IAB node 524 to transmit the backhaul access traffic via wireless backhaul link 546. In this example, IAB nodes 520 and 522 may each operate as both a scheduling entity and a scheduled entity to backhaul access traffic to/from IAB node 516. As such, communication between a pair of IAB nodes may be individually scheduled by one of the IAB nodes within the pair.

In other examples, an IAB node may schedule wireless backhaul communications between other pairs of IAB nodes. For example, IAB node 524 may operate as the scheduling entity for the IAB network 502, while IAB nodes 516, 520, and 522 each operate as a scheduled entity to backhaul access traffic to/from IAB node 516. In this example, IAB node 524 may schedule wireless backhaul communications between each of the pairs of IAB nodes (e.g., between IAB node 516 and IAB node 520, between IAB node 520 and IAB node 522, and between IAB node 522 and IAB node 524). As another example, IAB node 522 may operate as a scheduling entity to schedule wireless backhaul communications between IAB nodes 516 and 520 and also between IAB node 520 and IAB node 522. IAB node 522 may then operate as a scheduled entity to allow IAB node 524 to schedule wireless backhaul communications therebetween.

Figure 6:
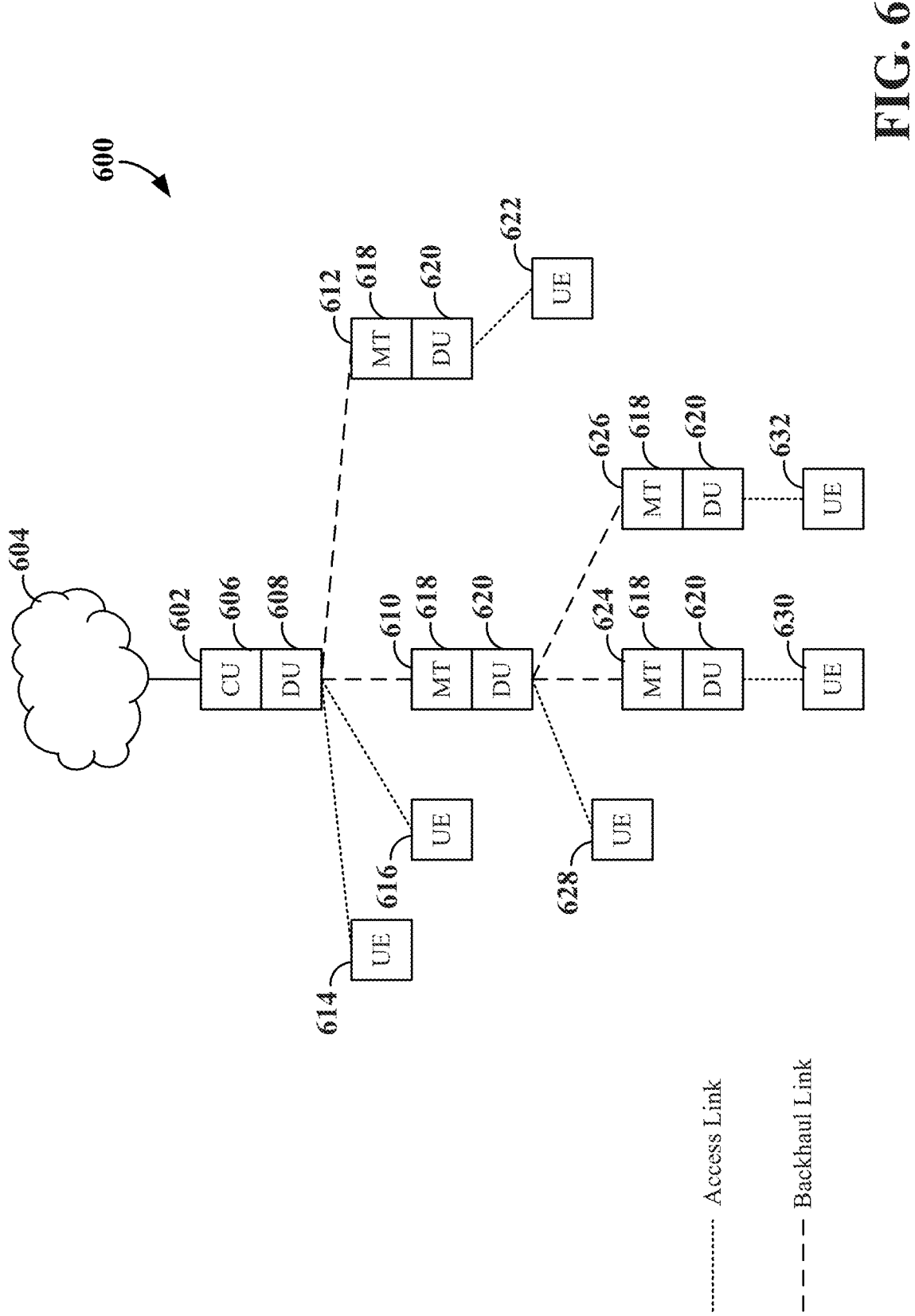
FIG. 6 is a diagram illustrating an example of IAB node functionality within an IAB network according to some aspects.

FIG. 6 is a schematic diagram illustrating an example of IAB node functionality within an IAB network 600. In the example shown in FIG. 6, an IAB node 602 is shown coupled to a core network 604 via a wireline connection. This IAB node 602 may be referred to herein as an IAB donor node, which may be, for example, an enhanced gNB including functionality for controlling the IAB network 600. In some examples, the IAB donor node 602 may include a central unit (CU) 606 and a distributed unit (DU) 608. The CU 606 is configured to operate as a centralized network node (or central entity) within the IAB network 600. For example, the CU 606 may include radio resource control (RRC) layer functionality and packet data convergence protocol (PDCP) layer functionality to control/configure the other nodes (e.g., IAB nodes and UEs) within the IAB network 600.

The DU 608 is configured to operate as a scheduling entity to schedule scheduled entities (e.g., other IAB nodes and UEs) of the IAB donor node 602. For example, the DU 608 of the IAB donor node 602 may operate as a scheduling entity to schedule IAB nodes 610 and 612 and UEs 614 and 616. Thus, the DU 608 of the IAB donor node 602 may schedule communication with IAB nodes 610 and 612 via respective backhaul links and schedule communication with UEs 614 and 616 via respective access links. In some examples, the DU 608 may include the radio link control (RLC), medium access control (MAC), and physical (PHY) layer functionality to enable operation as a scheduling entity.

Each of the IAB nodes 610 and 612 may be configured as a Layer 2 (L2) relay node including a respective DU 620 and a mobile termination (MT) unit 618 to enable each L2 relay IAB node 610 and 612 to operate as a scheduling entity and a scheduled entity. For example, the MT unit 618 within each of the L2 relay IAB nodes 610 and 612 is configured to operate as a scheduled entity that may be scheduled by the IAB donor node 602. Each MT unit 618 within the L2 relay IAB nodes 610 and 612 further facilitates communication with the IAB donor node 602 via respective backhaul links. In addition, the DU 620 within each of the L2 relay IAB nodes 610 and 612 operates similar to the DU 608 within the IAB donor node 602 to function as a scheduling entity to schedule one or more respective scheduled entities (e.g., other IAB nodes and/or UEs) of the L2 relay IAB nodes 610 and 612.

For example, the DU 620 of L2 relay IAB node 612 functions as a scheduling entity to schedule communication with a UE 622 via an access link, while the DU 620 of L2 relay IAB node 610 functions as a scheduling entity to schedule communication with the MT units 618 of L2 relay IAB nodes 624 and 626 via respective backhaul links and a UE 628 via an access link Each of the L2 relay IAB nodes 624 and 626 further includes a respective DU 620 that functions as a scheduling entity to communicate with respective UEs 630 and 632. Thus, in the network topology illustrated in FIG. 6, since IAB donor node 602 is configured to control each of the other nodes in the IAB network, the IAB donor node 602 is a parent IAB node of child IAB nodes 610, 612, 624 and 626. In addition, IAB node 610 is further a parent IAB node of child IAB nodes 624 and 626.

For example, the CU 606 and DU 608 within IAB donor node 602 may function as the parent IAB node of child IAB nodes 610, 612, 624, and 626 and the DU 620 within IAB node 610 may function as the parent IAB node of child IAB nodes 624 and 626. The MT unit 618 within IAB nodes 610, 612, 624, and 626 may further function as child IAB nodes.

In a mobile IAB network, one or more of the L2 relay IAB nodes 610, 612, 624, and/or 626 may be moving within the IAB network 600. For example, an L2 relay IAB node (e.g., IAB node 624) may be a mobile IAB node installed on a bus, train, taxi, or other moveable object. As the mobile IAB node 624 moves through the IAB network 600, the parent IAB node of the mobile IAB node 624 may change through a topology adaptation procedure. However, as the mobile IAB node 624 moves through the IAB network 600, a PCI collision may occur between the mobile IAB node 624 and another stationary or mobile L2 relay IAB node serving a cell assigned the same PCI. In addition, a PCI collision may also occur in a fixed IAB network 600 that utilizes zero-network planning (e.g., for an over-deployed network in which gNBs are added in an ad-hoc manner).

When two neighboring cells are assigned the same PCI, a scheduled entity (e.g., a UE or child IAB node) may not be able to differentiate reference signals from each of the neighboring cells, since the reference signals are scrambled based on the same PCI. In addition, a PCI collision between two neighboring cells may lead to timing synchronization and channel estimation issues at the UE, and may result in decoding failure of user data traffic transmitted from one of the two neighboring cells. Therefore, to mitigate PCI collision issues, the PCI for one of the two neighboring cells may be changed from an old PCI (e.g., the colliding PCI) to a new PCI.

However, for an RRC-connected scheduled entity (e.g., a UE or child IAB node), a sudden change in the PCI of the scheduling entity (e.g., gNB or parent IAB node) may result in an interruption in service. For example, the RRC-connected scheduled entity may still attempt to communicate with the scheduling entity using the old PCI, which may result in radio link failure (RLF) at the scheduled entity. Although the scheduled entity can re-connect to the scheduling entity with the new PCI via a cell re-selection procedure, the scheduled entity may not have service while experiencing RLF and during the cell re-selection procedure. In addition, idle or inactive scheduled entities camped onto the cell associated with the scheduling entity may experience longer call/connection setup times due to the PCI change. For example, a radio resource management (RRM) measurement for cell re-selection may involve a number of discontinuous reception (DRX) cycles for filtering, which may extend the amount of time needed for call/connection setup in idle or inactive scheduled entities.

Various aspects of the present disclosure are directed to a soft PCI change mechanism in which a scheduling entity (e.g., gNB or parent IAB node) may transition from a first (or old) PCI associated with a first (or old) cell to a second (or new) PCI associated with a second (or new) cell during a transition period. By utilizing a transition period to change from the first PCI to the second PCI, the impact of the PCI change on UEs and child IAB nodes may be reduced. In the transition period, the scheduling entity may operate using both the first PCI and the second PCI. In some examples, the second cell with the second PCI may operate fully or partially as an individual cell during the transition period. In addition, one or more scheduled entities (e.g., UEs or child IAB nodes) in communication with the scheduling entity may be transferred from the first cell to the second cell during the transition period using RRC-connected-mode cell handover and/or idle-mode cell re-selection procedures. The scheduling entity may then discontinue communicating in the first cell with the first PCI after completion of the transition period.

Figure 7:
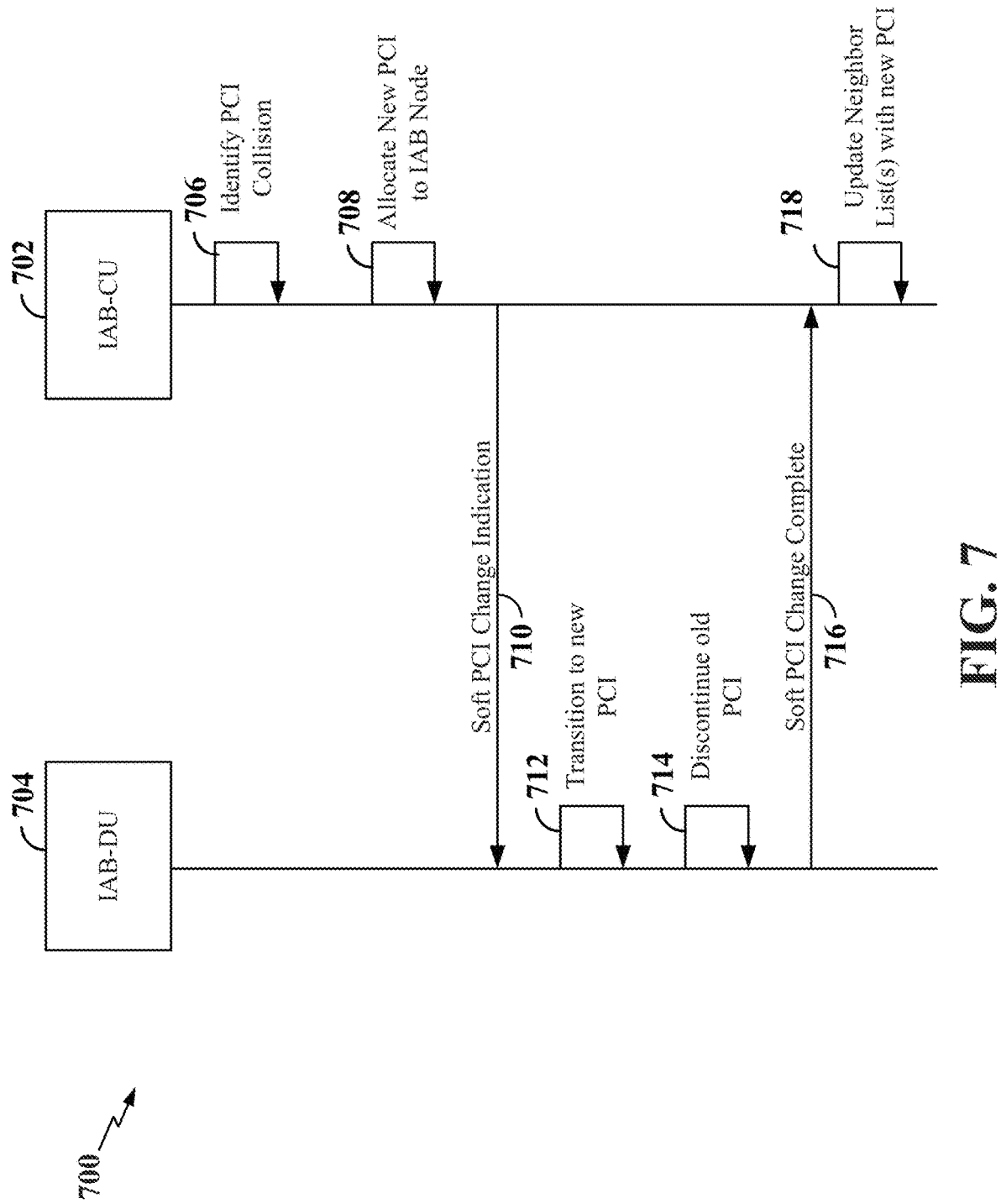
FIG. 7 is a diagram illustrating an example of a soft PCI change procedure according to some aspects.

FIG. 7 illustrates an example of a soft PCI change procedure that may be performed, for example, within an IAB network 700. In the example shown in FIG. 7, a centralized network node associated with the IAB network 700 renders the decision on whether to perform the soft PCI change for a scheduling entity (e.g., an IAB-DU 704, which may be, for example, a DU within an L2 relay IAB node). The centralized network node may be, for example, a network entity configured for PCI management, a base station (e.g., gNB or eNB) with a larger coverage area in the IAB network 700 (e.g., a parent IAB node or other base station with a coverage area larger than the coverage area of the scheduling entity), or an IAB-CU 702 (e.g., within an IAB donor node) of the IAB network 700, the latter being illustrated in FIG. 7. As shown in FIG. 7, the centralized network node (e.g., IAB-CU 702) is in communication with the IAB-DU 704 via one or more backhaul links.

At 706, the IAB-CU 702 identifies a PCI collision associated with the IAB-DU 704. For example, the PCI collision may be between the IAB-DU 704 and a neighboring IAB-DU (not shown, for simplicity). In some examples, the IAB-CU 702 may identify the PCI collision through topology adaptation procedures performed as a result of a mobile IAB node and/or neighbor list updates provided by L2 relay IAB nodes. In some examples, the IAB-CU 702 may identify a potential PCI collision through received measurement report(s) from scheduled entities (e.g., UE and/or MT units of child IAB nodes). Upon discovering the PCI collision, at 708, the IAB-CU 702 assigns a new PCI to the IAB-DU 704. At 710, the IAB-CU 702 then transmits a message (e.g., an RRC message) including a soft PCI change indication with the new PCI to the IAB-DU 704. In some examples, the message including the soft PCI change indication may be a signal defined at the F1-AP interface between the IAB-CU 702 and the IAB-DU 704.

At 712, the IAB-DU 704 transitions to the new PCI during a transition period associated with the soft PCI change. During the transition period, the IAB-DU 704 serves two cells: a first cell associated with the old PCI (or first PCI) and a second cell associated with the new PCI (or second PCI). In some examples, the second cell with the second PCI may operate fully or partially as an individual cell during the transition period. For example, the IAB-DU 704 may transmit synchronization signal blocks (SSBs) within both the first cell and the second cell during the transition period. In some examples, the SSBs between the first and second cells are separated in one or more of a frequency domain, time domain, or a code domain. For example, the SSBs in the second cell may be transmitted at a different half frame location than SSBs in the first cell (e.g., every other half frame location) with the same SSB periodicity in both the first and second cells (e.g., every other frame). As another example, the SSBs in the second cell may be transmitted at a different synchronization frequency raster than the SSBs in the first cell. As another example, when the number of transmitted SSBs within the SSB periodicity of the first cell is less than thirty-two, SSBs in the second cell may be transmitted at a different subset of SSB locations within the same half frame period as the SSBs in the first cell. In examples in which the SSBs that carry the second PCI overlap with the SSBs that carry the first PCI in frequency and/or time, the SSBs in the first and second cells may be separated in the code domain with some cross-interference.

The IAB-DU 704 may further coordinate scheduling between the first cell and the second cell during the transition period to avoid interference. For example, the IAB-DU 704 may allocate orthogonal resources between the first and second cells during the transition period to communicate with UEs and/or IAB nodes served by the IAB-DU 704. An exception to this may be the configuration of the PRACH in the first cell and the second cell. In some examples, the IAB-DU 704 may utilize the PRACH configuration of the first cell in the second cell and discontinue monitoring the PRACH in the first cell during the transition period.

The IAB-DU 704 may further utilize different power levels in the first and second cells during the transition period. For example, the power level of the first cell may be ramped down, while the power level of the second cell may be ramped up during the transition period. Thus, the power level of the first cell may be less than the power level of the second cell. The power level of the SSB in each cell may be included, for example, in the SIB1, while the power level of other downlink channels may be specified with an offset relative to the SSB.

The IAB-DU 704 may further transfer UEs and/or IAB nodes (e.g., scheduled entities) served by the IAB-DU 704 from the first cell to the second cell during the transition period. In some examples, the IAB-DU 704 may transfer RRC-connected scheduled entities from the first cell to the second cell by performing a respective handover of the RRC-connected scheduled entities from the first cell to the second cell. The handover may be initiated by the centralized network node (e.g., the IAB-CU 702) or by the IAB-DU 704. In some examples, the handovers may be initiated without configuration of handover measurements or receipt of a handover report from the RRC-connected scheduled entities. In other examples, handover measurements can be configured using a respective beam direction corresponding to a respective latest serving beam direction utilized in the first cell for the RRC-connected scheduled entities. In some examples, the handovers may be implemented using PRACH resources in the second cell that include a respective beam direction corresponding to the respective latest serving beam direction utilized in the first cell for the RRC-connected scheduled entities.

In some examples, the IAB-DU 704 may transfer camped scheduled entities (e.g., idle or inactive scheduled entities) from the first cell to the second cell by updating system information with a cell bar indication for the first cell. The IAB-DU 704 may then page the camped scheduled entities to notify the camped scheduled entities of the updated system information to enable the camped scheduled entities to select and camp onto the second cell.

At 714, the IAB-DU 704 may discontinue communicating in the first cell with the first PCI (or old PCI) after completion of the transition period. In some examples, the transition period may correspond to a predetermined period of time. For example, the predetermined period of time may be predefined for the IAB network 700 or configured by the IAB network 700. In other examples, the transition period may correspond to a variable duration of time within which at least one of the RRC-connected scheduled entities served by the IAB-DU 704 is transferred from the first cell to the second cell. For example, the IAB-DU 704 may discontinue using the first PCI upon reception of a release command (e.g., a UE context release command) from the IAB-CU 702 for one or more RRC-connected scheduled entities. As another example, the IAB-DU 704 may discontinue using the first PCI upon receipt of a handover complete message (e.g., an RRCReconfigurationComplete message) from one or more RRC-connected scheduled entities.

At 716, the IAB-DU 704 may transmit a message including a soft PCI change complete indication to the IAB-CU 702 after completion of the transition from the old PCI to the new PCI (e.g., after discontinuing using the old PCI). At 718, the IAB-CU 702 may update one or more neighbor lists with the new PCI and provide the updated neighbor lists to neighboring IAB nodes of the IAB-DU 704. In examples in which a centralized network node other than the IAB-CU 702 decides to perform the soft PCI change, the centralized network node may transmit a signal indicating the soft PCI change to the IAB-DU 704 and may further transmit another signal indicating the soft PCI change to the IAB-CU 702 to enable the IAB-CU 702 to update the neighbor list(s) with the new PCI of the IAB-DU 704. In some examples, the IAB-CU 702 may further coordinate with neighbor IAB nodes (e.g., gNBs and/or eNBs) of the IAB-DU 704 via an Xn/X2 interface to update a mapping between the new PCI and the NCGI associated with the IAB-DU 704.

Figure 8:
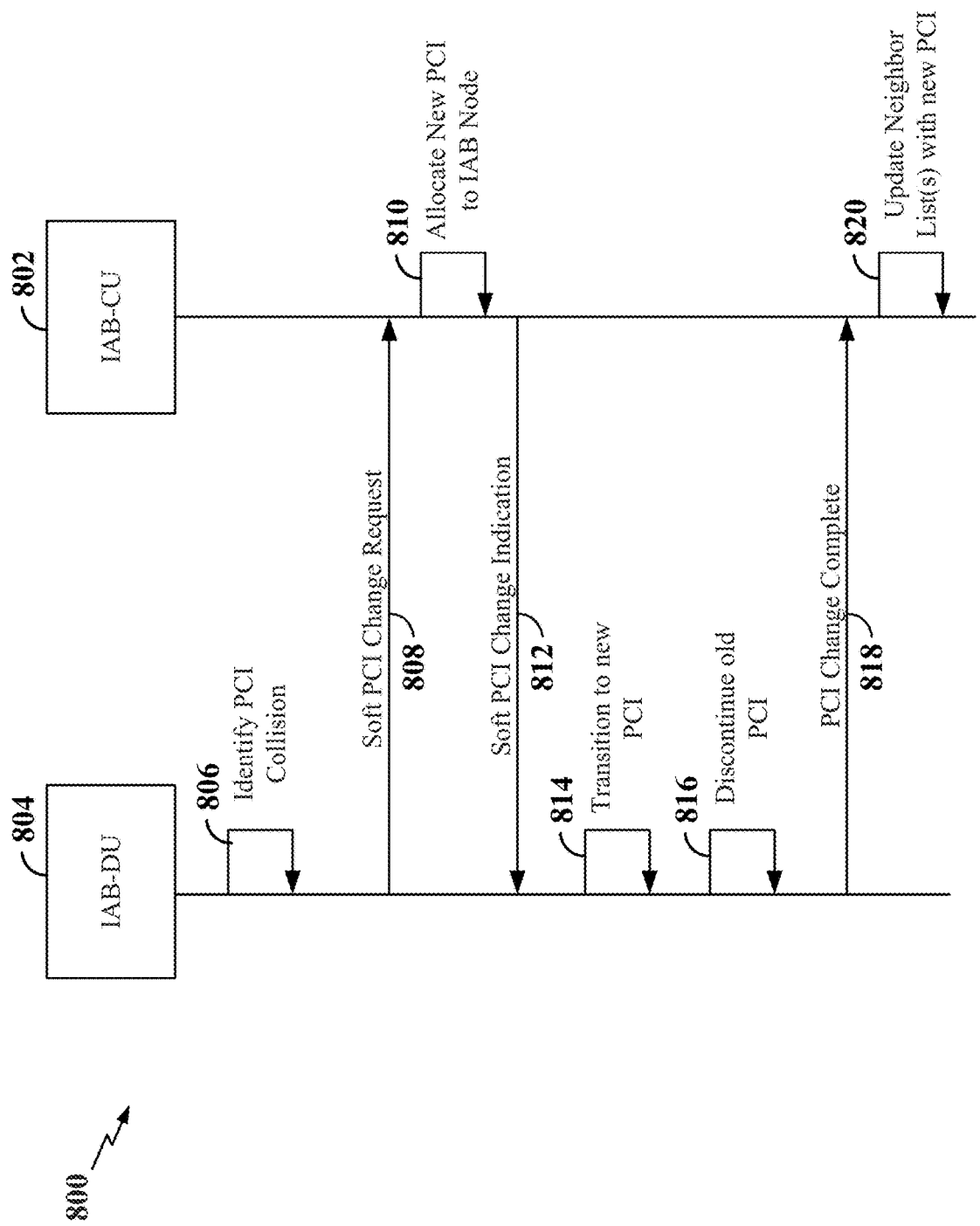
FIG. 8 is a diagram illustrating another example of a soft PCI change procedure according to some aspects.

FIG. 8 is a diagram illustrating another example of a soft PCI change procedure that may be performed, for example, within an IAB network 800. In the example shown in FIG. 8, an IAB-DU 804 (e.g., a DU within an L2 relay IAB node) may autonomously decide to initiate the soft PCI change and may communicate the soft PCI change decision to an IAB-CU 802 (e.g., a CU within an IAB donor node). At 806, the IAB-DU 804 identifies a PCI collision associated with the IAB-DU 804. For example, the PCI collision may be between the IAB-DU 804 and a neighboring IAB-DU (not shown, for simplicity). In some examples, the IAB-DU 804 may identify the PCI collision through neighbor list updates. In some examples, the IAB-DU 804 may identify the PCI collision via an inter-relay discovery procedure through the co-located MT unit, where the co-located MT unit discovers another IAB-node with the same PCI as the IAB-DU 804.

Upon discovering the PCI collision, at 808, the IAB-DU 804 transmits a message including a soft PCI change request to the IAB-CU 802. At 810, the IAB-CU 802 assigns a new PCI to the IAB-DU 804, and at 812, the IAB-CU 802 transmits a message including a soft PCI change indication with the new PCI to the IAB-DU 804. In some examples, the messages including the soft PCI change request and the soft PCI change indication may be signals defined at the F1-AP interface between the IAB-CU 802 and the IAB-DU 804. In other examples, the IAB-DU 804 may select the new PCI and provide the new PCI to the IAB-CU 802.

At 814, the IAB-DU 804 transitions to the new PCI during a transition period associated with the soft PCI change, as described above in reference to FIG. 7. At 816, the IAB-DU 804 may discontinue communicating in the first cell with the first PCI (or old PCI) after completion of the transition period, as described above in reference to FIG. 7. At 818, the IAB-DU 804 may transmit a message including a soft PCI change complete indication to the IAB-CU 802 after completion of the transition from the old PCI to the new PCI (e.g., after discontinuing using the old PCI). At 820, the IAB-CU 802 may update one or more neighbor lists with the new PCI and provide the updated neighbor lists to neighboring IAB nodes of the IAB-DU 804.

Figure 9:
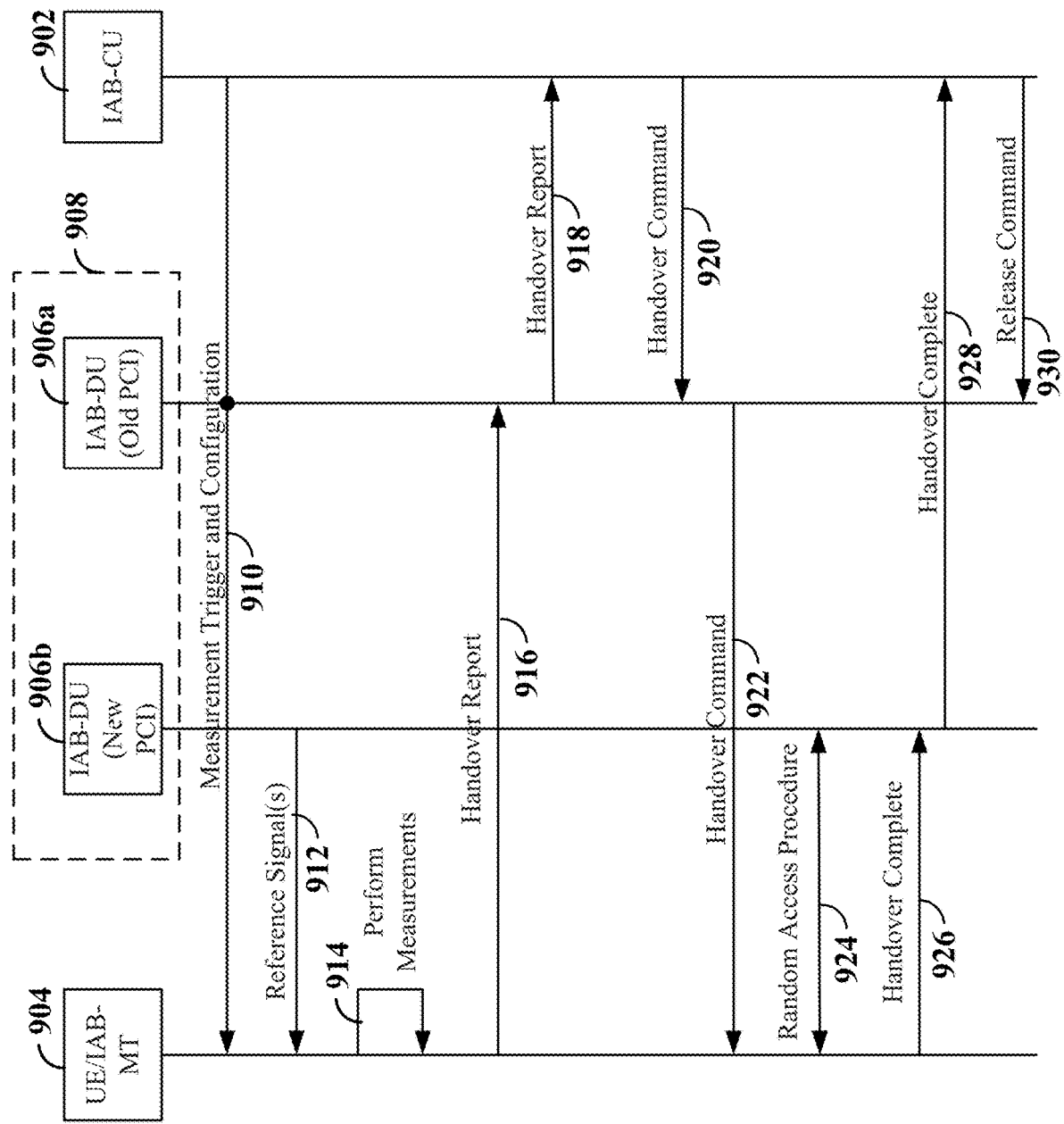
FIG. 9 is a diagram illustrating an exemplary handover procedure to handover a scheduled entity from a first cell with a first PCI associated with a scheduling entity to a second cell with a second PCI associated with the scheduling entity according to some aspects.

FIG. 9 is a diagram illustrating an exemplary handover procedure to handover a scheduled entity (e.g., UE or child IAB node) from a first cell with a first PCI (or old PCI) associated with a scheduling entity (e.g., gNB or parent IAB node) to a second cell with a second PCI (or new PCI) associated with the scheduling entity. In the example shown in FIG. 9, an IAB-CU 902 (e.g., a CU within an IAB donor node) is in communication with a scheduling entity 908 via one or more backhaul links. In addition, the scheduling entity 908 is in communication with a scheduled entity 904 (e.g., a UE or IAB-MT of a child IAB node) via an access link.

Upon initiating a soft PCI change (e.g., either by the IAB-CU 902 or autonomously by the scheduling entity 908), the IAB-CU 902 may initiate handover of the scheduled entity 904 from the first cell (e.g., an IAB-DU 906a serving the first cell with the first PCI) to the second cell (e.g., an IAB-DU 906b serving the second cell with the second PCI). Here, each IAB-DU 906a and 906b is a logical representation of the DU functionality within the scheduling entity 908 associated with each cell. In the example shown in FIG. 9, at 910, the IAB-CU 902 may trigger the scheduled entity 904 to perform a handover measurement and configure one or more cell measurements (e.g., one or more measurement objects) for the scheduled entity 904.

Each measurement object may be configured by the RRC layer in the IAB-CU 902 and correspond to a particular reference signal (e.g., SSB or CSI-RS) transmitted in the second cell. The IAB-CU 902 may configure a set of resources (e.g., SSB and/or CSI-RS resources) for measurement, and each resource may correspond to a downlink beam of a plurality of downlink beams, each in a different direction, in the second cell. In some examples, the SSB/CSI-RS resources configured for handover measurements by the scheduled entity may include SSB/CSI-RS resources associated with beam directions related to the latest serving beam (e.g., the same beam direction) utilized by the IAB-DU 906a to communicate with the scheduled entity 904 in the first cell.

In examples in which the measurement object is based on the SSB, the carrier frequency value and subcarrier spacing for the SSB in case of inter-frequency measurement, along with a measurement window in time may also be configured. In addition, the IAB-CU 902 may indicate a specific set of SSBs to search and measure and may further indicate whether the network is synchronous, such that the second cell's SSB time-frequency location and index may be derived from the first cell.

In examples in which a CSI-RS measurement object is configured, the carrier frequency value in case of inter-frequency measurement, the PCI of the second cell, and the time-frequency resources for a set of CSI-RS may be configured. In addition, the timing may be configured based on the timing in the first cell or an associated SSB of the second cell. In some examples, since the timing and PCI of the second cell are known (e.g., the first cell and second cell are co-located with known timing, beam directions, etc.), the IAB-CU 902 may configure a CSI-RS measurement object instead of an SSB measurement object for the scheduled entity 904.

In some examples, the IAB-CU 902 may include the second cell with the second PCI in a "white list" for the scheduled entity 904 and provide the "white list" to the scheduled entity 904 via RRC signaling. The IAB-CU 902 may further set a corresponding flag with the scheduled entity 904 via RRC signaling so that only cells in the "white list" are measured by the scheduled entity 904.

At 912, the IAB-DU 906b within the scheduling entity 908 serving the second cell may transmit one or more reference signals corresponding to the measurement object (s) configured by the IAB-CU 902 in the second cell. At 914, the scheduled entity 904 may perform handover measurements of the one or more reference signals. For example, the scheduled entity 904 may measure the reference signal received power (RSRP) of each of the one or more reference signals. At 916, the scheduled entity 904 may transmit a handover report to the IAB-DU 906a within the scheduling entity 908 serving the first cell. The handover report may include, for example, the second PCI of the second cell, an index of the reference signal (e.g., an SSB index or CSI-RS index) with the highest measured RSRP, and a measurement value (e.g., the RSRP) associated with the reference signal. At 918, the IAB-DU 906a may forward the handover report to the IAB-CU 902.

At 920, the IAB-CU 902 may then generate and transmit a handover command (e.g., an RRCReConfiguration message) for the scheduled entity 904 to the IAB-DU 906a serving the first cell, and at 922, the IAB-DU 906a may forward the handover command to the scheduled entity 904. At 924, the scheduled entity 904 may perform a random access procedure with the second cell (e.g., the IAB-DU 906b within the scheduling entity 908 serving the second cell) to establish a connection with the IAB-DU 906b. In some examples, a contention-free RACH procedure may be performed to the second cell. In this example, dedicated PRACH resources may be configured within the RRCReConfiguration message. To more efficiently implement the handover, the dedicated PRACH resources assigned in the RRCReConfiguration message may be associated with an SSB/CSI-RS in the second cell with a beam direction related to the latest serving beam direction (e.g., the same beam direction) in the first cell. In other examples, a contention-based RACH procedure may be performed by the scheduled entity 904 to the second cell.

In a RACH procedure, the scheduled entity 904 may transmit a preamble to the IAB-DU 906b in a RACH preamble message. For contention-free RACH, the preamble to be utilized by the scheduled entity 904 may be transmitted in the RRCReConfiguration message. For contention-based RACH, the scheduled entity 904 may randomly select the preamble from an available set of preambles. If the preamble is successfully detected by the IAB-DU 906b, the IAB-DU 906b transmits a random access response (RAR) message to the scheduled entity 904. The RAR message includes an identifier of the preamble sent by the scheduled entity 904, a timing advance (TA) value, a temporary cell radio network identifier (TC-RNTI) or random access (RA) RNTI for the scheduled entity and a grant of uplink resources. Upon receipt of the RAR message, the scheduled entity 904 may apply the TA and initiate an uplink transmission using the assigned uplink resources. For contention-based RACH, the RAR message may be followed by an uplink transmission (e.g., Msg3) from the scheduled entity 904, and a contention resolution message from the IAB-DU 906b (e.g., scheduling entity) to the scheduled entity 904.

Upon successfully completing the RACH procedure, at 926, the scheduled entity may 904 transmit a handover complete message (e.g., an RRCReConfigurationComplete message) to the second cell (e.g., the IAB-DU 906b) to complete the handover. At 928, the IAB-DU 906b may transmit the handover complete message to the IAB-CU 902. At 930, the IAB-CU 902 may transmit a release command (e.g., a UE Context Release command) for the scheduled entity 904 to the IAB-DU 906a.

Figure 10:
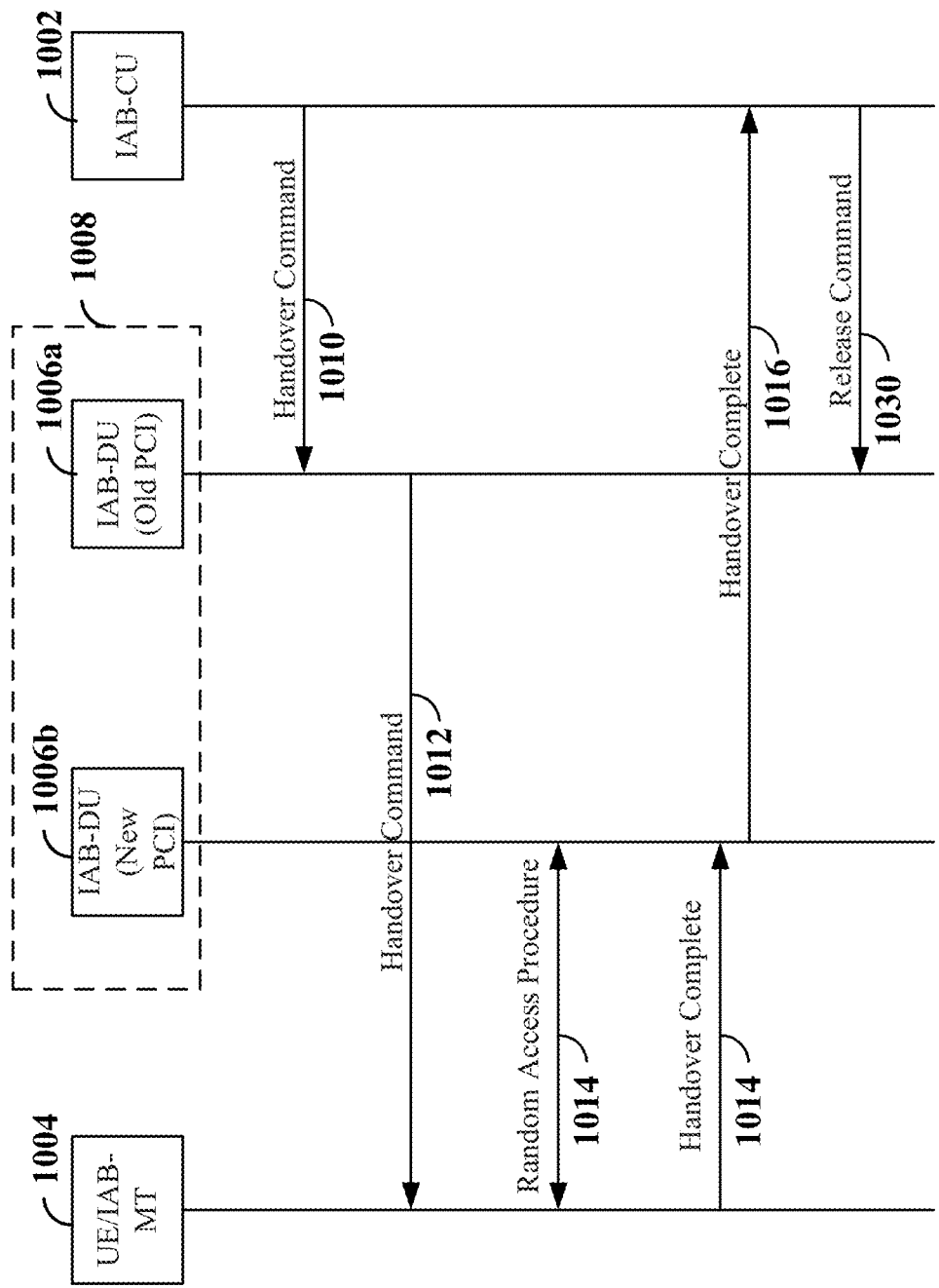
FIG. 10 is a diagram illustrating another exemplary handover procedure to handover a scheduled entity from a first cell with a first PCI associated with a scheduling entity to a second cell with a second PCI associated with the scheduling entity according to some aspects.

FIG. 10 is a diagram illustrating another exemplary handover procedure to handover a scheduled entity (e.g., UE or child IAB node) from a first cell with a first PCI (or old PCI) associated with a scheduling entity (e.g., gNB or parent IAB node) to a second cell with a second PCI (or new PCI) associated with the scheduling entity. In the example shown in FIG. 10, an IAB-CU 1002 (e.g., a CU within an IAB donor node) is in communication with a scheduling entity 1008 via one or more backhaul links. In addition, the scheduling entity 1008 is in communication with a scheduled entity 1004 (e.g., a UE or IAB-MT of a child IAB node) via an access link.

Upon initiating a soft PCI change (e.g., either by the IAB-CU 1002 or autonomously by the scheduling entity 1008), the IAB-CU 1002 may initiate handover of the scheduled entity 1004 from the first cell (e.g., an IAB-DU 1006a serving the first cell with the first PCI) to the second cell (e.g., an IAB-DU 1006b serving the second cell with the second PCI). Here, each IAB-DU 1006a and 1006b is a logical representation of the DU functionality within the scheduling entity 1008 associated with each cell. In the example shown in FIG. 10, at 1010, the IAB-CU 1002 initiates a handover of the scheduled entity 1004 without configuring measurement objects for the scheduled entity 1004 and without the scheduled entity 1004 performing any handover measurements or transmitting a handover report. For example, the IAB-CU 1002 may initiate the handover, at 1010, by generating and transmitting a handover command (e.g., an RRCReConfiguration message) to the IAB-DU 1006a serving the first cell.

At 1012, the IAB-DU 1006a may forward the handover command to the scheduled entity 1004. At 1014, the scheduled entity 1004 may perform a random access procedure with the second cell (e.g., the IAB-DU 1006b within the scheduling entity 1008 serving the second cell) to establish a connection with the IAB-DU 1006b. In some examples, a contention-free RACH procedure may be performed to the second cell. In this example, dedicated PRACH resources may be configured within the RRCReConfiguration message. To more efficiently implement the handover, the dedicated PRACH resources assigned in the RRCReConfiguration message may be associated with an SSB/CSI-RS with a beam direction related to the latest serving beam direction (e.g., the same beam direction) in the first cell. In other examples, a contention-based RACH procedure may be performed by the scheduled entity 1004 to the second cell.

Upon successfully completing the RACH procedure, at 1016, the scheduled entity 1004 may transmit a handover complete message (e.g., an RRCReConfigurationComplete message) to the second cell (e.g., the IAB-DU 1006b) to complete the handover. At 1018, the IAB-DU 1006b may transmit the handover complete message to the IAB-CU 1002. At 1020, the IAB-CU 1002 may transmit a release command (e.g., a UE Context Release command) for the scheduled entity 1004 to the IAB-DU 1006a.

Figure 11:
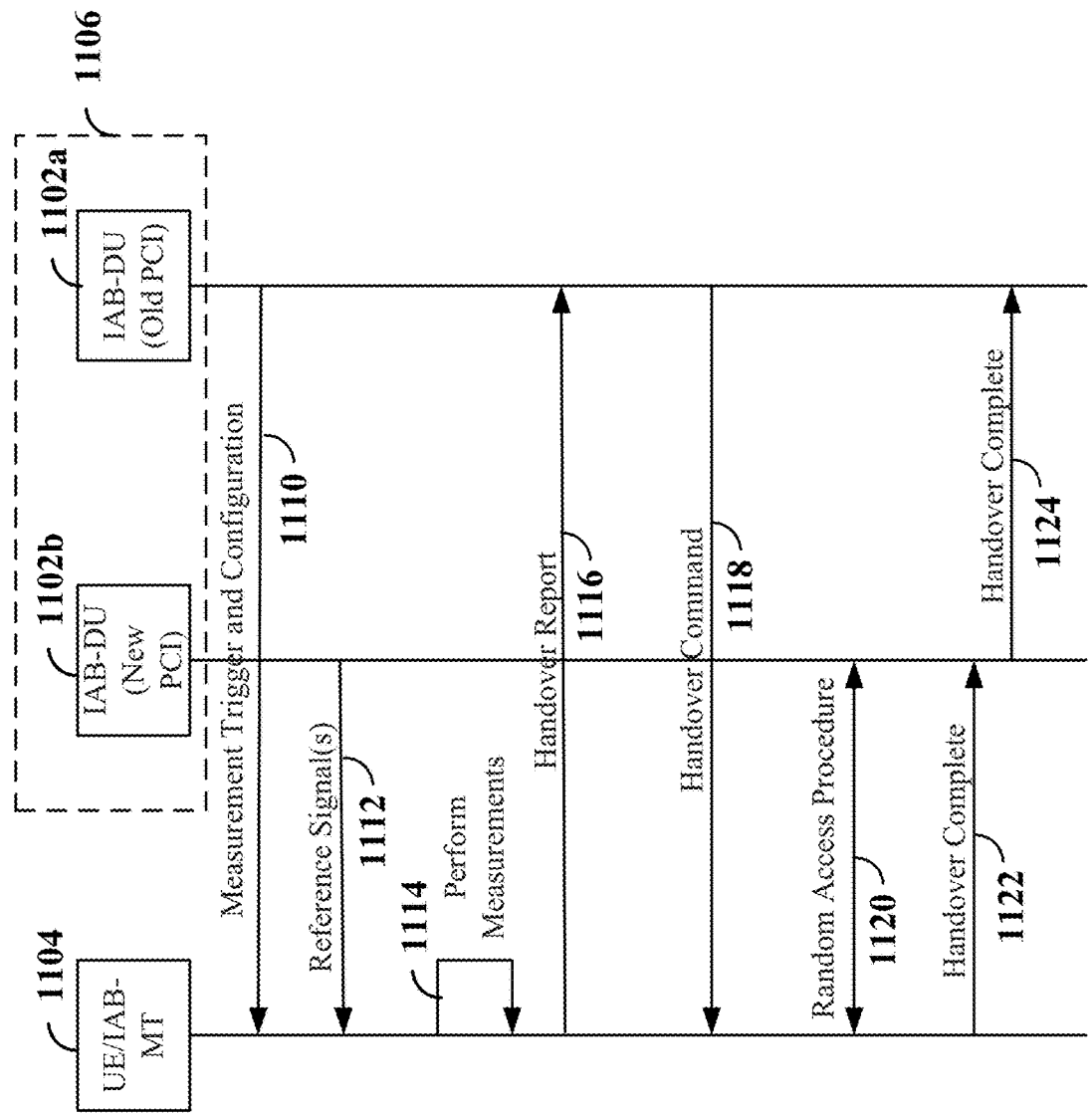
FIG. 11 is a diagram illustrating another exemplary handover procedure to handover a scheduled entity from a first cell with a first PCI associated with a scheduling entity to a second cell with a second PCI associated with the scheduling entity according to some aspects.

FIG. 11 is a diagram illustrating another exemplary handover procedure to handover a scheduled entity from a first cell with a first PCI associated with a scheduling entity to a second cell with a second PCI associated with the scheduling entity. In the example shown in FIG. 11, a scheduling entity (e.g., a gNB or parent IAB node) 1106 is in communication with a scheduled entity 1104 (e.g., a UE or IAB-MT of a child IAB node) via an access link. The scheduling entity 1106 may be, for example, an RRC-enhanced IAB node implementing at least a portion of the RRC functionality.

Upon initiating a soft PCI change (e.g., either by an IAB donor node or autonomously by the scheduling entity 1106), an IAB-DU 1102a within the scheduling entity 1106 serving the first cell may initiate handover of the scheduled entity 1104 from the first cell to the second cell (e.g., an IAB-DU 1102b serving the second cell with the second PCI). Here, each IAB-DU 1102*a* and 1102*b* is a logical representation of the DU functionality within the scheduling entity 1106 associated with each cell. In the example shown in FIG. 11, at 1110, the IAB-DU 1102*a* may trigger the scheduled entity 1104 to perform a handover measurement and configure one or more cell measurements (e.g., one or more measurement objects) for the scheduled entity 1104. Each measurement object may be configured by the RRC layer in the IAB-DU 1102*a* and correspond to a particular reference signal (e.g., SSB or CSI-RS) transmitted in the second cell.

At 1112, the IAB-DU 1102*b* within the scheduling entity 1106 serving the second cell may transmit one or more reference signals corresponding to the measurement object(s) configured by the IAB-DU 1102*a* in the second cell. At 1114, the scheduled entity 1104 may perform handover measurements of the one or more reference signals. For example, the scheduled entity 1104 may measure the reference signal received power (RSRP) of each of the one or more reference signals. At 1116, the scheduled entity 1104 may transmit a handover report to the IAB-DU 1102*a* within the scheduling entity 1106 serving the first cell. The handover report may include, for example, the second PCI of the second cell, an index of the reference signal (e.g., an SSB index or CSI-RS index) with the highest measured RSRP, and a measurement value (e.g., the RSRP) associated with the reference signal. In other examples, the IAB-DU 1102*a* may initiate the handover without configuring measurement objects for the scheduled entity 1104 and without the scheduled entity 1104 performing any handover measurements or transmitting the handover report.

At 1118, the IAB-DU 1102*a* generates and transmits a handover command (e.g., an RRCReConfiguration message) to the scheduled entity 1104. At 1120, the scheduled entity 1104 may perform a random access procedure with the second cell (e.g., the IAB-DU 1102*b* within the scheduling entity 1106 serving the second cell) to establish a connection with the IAB-DU 1102*b*. In some examples, a contention-free RACH procedure may be performed to the second cell. In this example, dedicated PRACH resources may be configured within the RRCReConfiguration message. To more efficiently implement the handover, the dedicated PRACH resources assigned in the RRCReConfiguration message may be associated with an SSB/CSI-RS with a beam direction related to the latest serving beam direction (e.g., the same beam direction) in the first cell. In other examples, a contention-based RACH procedure may be performed by the scheduled entity 1104 to the second cell. Upon successfully completing the RACH procedure, at 1122, the scheduled entity 1104 may transmit a handover complete message (e.g., an RRCReConfigurationComplete message) to the second cell (e.g., the IAB-DU 1102*b*) to complete the handover, which may then forward the handover complete message to the first cell (e.g., IAB-DU 1102*a*), at 1124.

Figure 12:
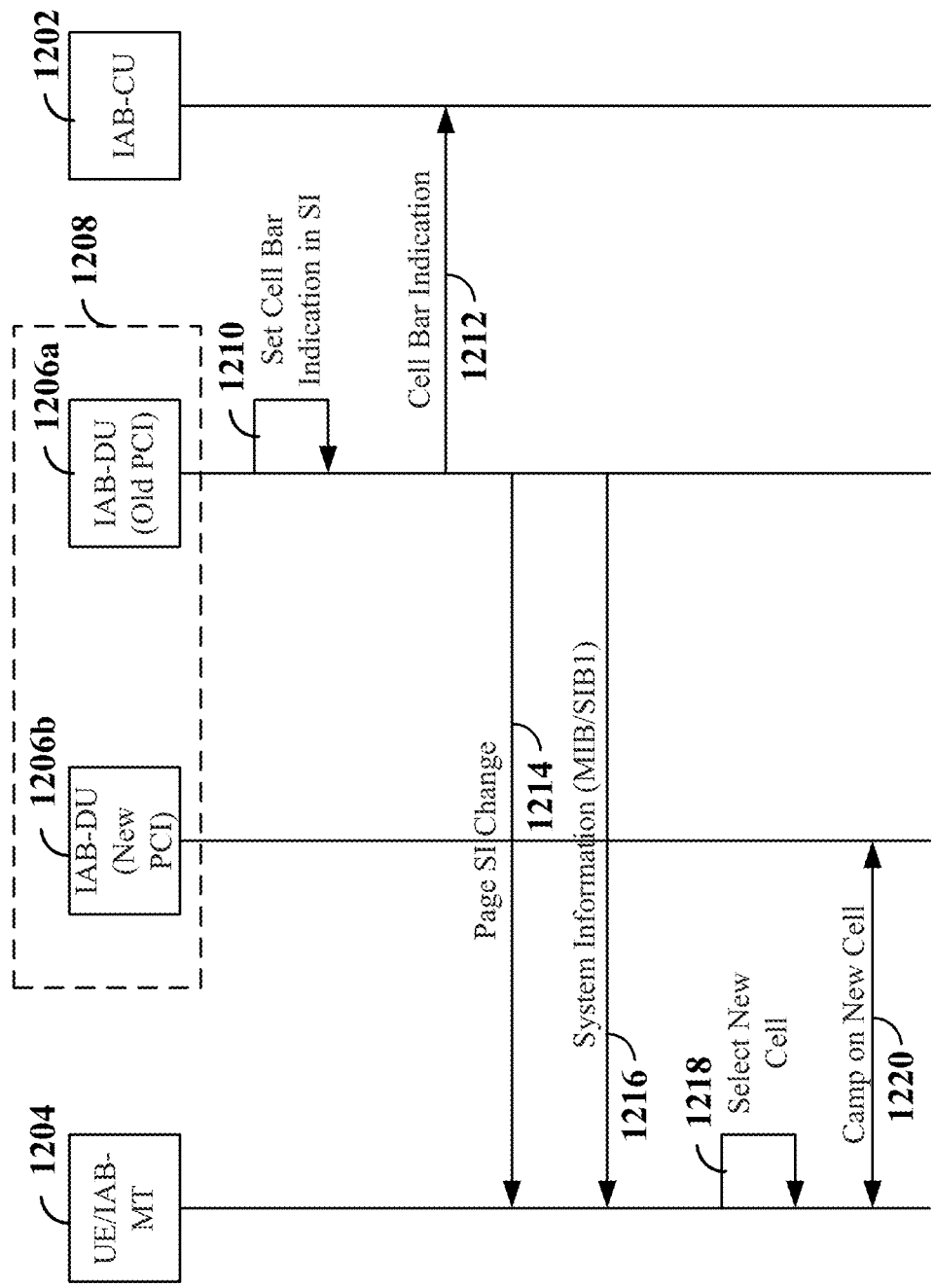
FIG. 12 is a diagram illustrating an exemplary cell re-selection procedure for a scheduled entity to camp onto a new cell during a PCI change according to some aspects.

FIG. 12 is a diagram illustrating an exemplary cell reselection procedure for a scheduled entity to camp onto a new cell during a PCI change. In the example shown in FIG. 12, an IAB-CU 1202 (e.g., a CU within an IAB donor node) is in communication with a scheduling entity 1208 (e.g., a gNB or eNB) via one or more backhaul links. In addition, the scheduling entity 1208 is in communication with a scheduled entity 1204 (e.g., an idle or inactive UE) via an access link. The scheduled entity 1204 is camped onto a first cell served by an IAB-DU 1206*a* within the scheduling entity 1208.

To facilitate cell re-selection by the camped scheduled entity 1204 from the first cell to a second cell served by an IAB-DU 1206*b* within the scheduling entity 1208 during a PCI change from a first PCI of the first cell to a second PCI of the second cell, at 1210, the IAB-DU 1206*a* may set a cell bar indication for the first cell in system information (SI). For example, the IAB-DU 1206*a* may include the PCI of the first cell in a list of barred cells in the MIB/SIB 1. When the cell status "barred" is indicated for a particular cell, the scheduled entity 1204 may not be permitted to select or reselect that particular cell and may then perform a cell re-selection procedure to select a new cell. At 1212, the IAB-DU 1206*a* may further provide the cell bar indication to the IAB-CU.

At 1214, the IAB-DU 1206*a* may further page the camped scheduled entity 1204 to notify the camped scheduled entity of a change in SI. For example, the notification of SI change may be transmitted over the paging channel via a short message field in a PDCCH DCI format 1_0. Upon being paged, the camped scheduled entity 1204 may receive and process the updated MIB/SIB1 including the cell bar indication for the first cell transmitted by the IAB-DU 1206*a* at 1216. The camped scheduled entity 1204 may then determine that the first cell is barred (e.g., from the cell bar indication in the MIB/SIB1), and at 1218, select a new cell to camp onto. In some examples, the second cell with the second PCI may be included in a neighbor cell list for cell selection to enable the camped scheduled entity 1204 to select the second cell to camp onto. The neighbor list may include one or more parameters (e.g., q-offsetCell, q-rxLevMinOffsetCell, q-RxLevMinOffsetCellSUL, q-QualMinOffsetCell) associated with each cell in the neighbor cell list. In some examples, one or more of the parameters indicated for the second cell may be more favorable than other cells in the neighbor list to facilitate selection of the second cell. Upon selecting the second cell, at 1220, the scheduled entity 1204 may camp onto the second cell via the IAB-DU 1206*b* within the scheduling entity 1208 serving the second cell. By setting the cell bar indication in SI and paging the camped scheduled entity 1204, the camped scheduled entity 1204 may more quickly select the second cell to camp onto.

Figure 13:
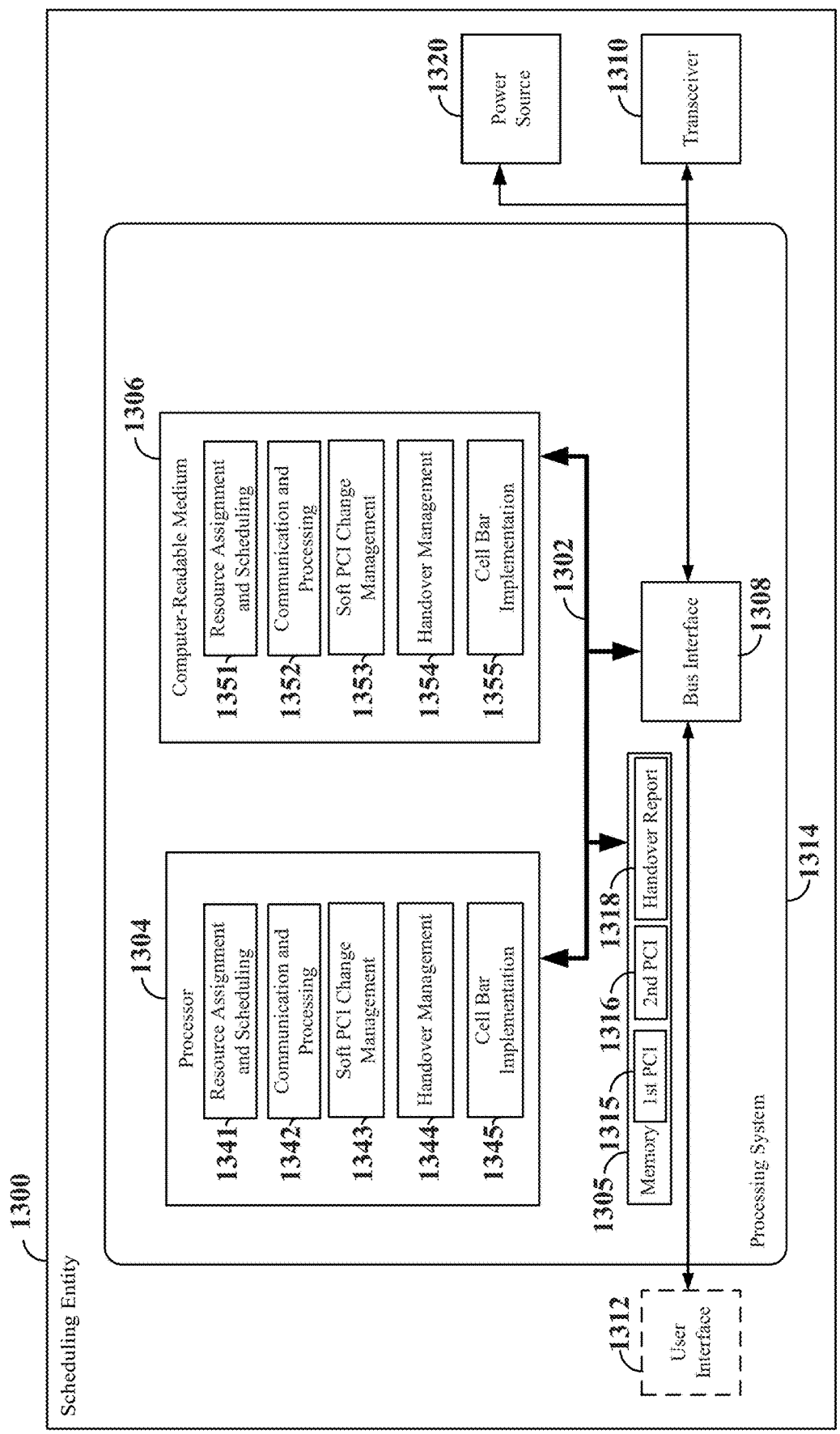
FIG. 13 is a block diagram illustrating an example of a hardware implementation for a scheduling entity employing a processing system according to some aspects.

FIG. 13 is a block diagram illustrating an example of a hardware implementation for a scheduling entity 1300 employing a processing system 1314. For example, the scheduling entity 1300 may be a base station (e.g., eNB, gNB), IAB donor node (e.g., CU and/or DU of an IAB donor node), L2 relay IAB node (e.g., DU of an L2 relay donor node), or other scheduling entity as illustrated in any one or more of FIGS. 1, 2, and 4-12.

The scheduling entity 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1300 may be configured to perform any one or more of the functions described herein. That is, the processor 1304, as utilized in a scheduling entity 1300, may be used to implement any one or more of the processes and procedures described below.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a communication interface or means for communicating with various other apparatus over a transmission medium (e.g., air). Depending upon the nature of the apparatus, a user interface 1312 (e.g., keypad, display, speaker, microphone, joystick, touchscreen) may also be provided. Of course, such a user interface 1312 is optional, and may be omitted in some examples.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1304 may include circuitry configured for various functions. For example, the processor 1304 may include resource assignment and scheduling circuitry 1341, configured to generate, schedule, and modify a resource assignment or grant of time-frequency resources (e.g., a set of one or more resource elements) in one or more beam directions. For example, the resource assignment and scheduling circuitry 1341 may schedule time-frequency resources within a plurality of time division duplex (TDD) and/or frequency division duplex (FDD) slots to carry user data traffic and/or control information to and/or from a set of one or more scheduled entities (e.g., UEs or child IAB nodes). Thus, the resource assignment and scheduling circuitry 1341 may be configured within a DU of an IAB donor node or L2 relay IAB node.

In various aspects of the disclosure, the resource assignment and scheduling circuitry 1341 may further be configured to schedule transmissions in both a first cell with a first PCI 1315 associated with the scheduling entity 1300 and a second cell with a second PCI 1316 associated with the scheduling entity 1300 during a transition period of a soft PCI change from the first PCI 1315 to the second PCI 1316. The first and second PCI 1315 and 1316 may be maintained, for example, in memory 1305. In some examples, the first cell and the second cell may be co-located such that coverage areas of the first and second cells completely overlap. For example, the resource assignment and scheduling circuitry 1341 may be configured to schedule respective transmissions of a first SSB in the first cell and a second SSB in the second cell during the transition period, where the first SSB and the second SSB are separated in at least one of a time domain, a frequency domain, or a code domain. In addition, the resource assignment and scheduling circuitry 1341 may schedule or allocate orthogonal resources between the first cell and the second cell for communication of control information and/or user data traffic with the set of scheduled entities during the transition period.

The resource assignment and scheduling circuitry 1341 may further be configured to schedule transmission of a message (e.g., RRC signal) including a soft PCI change indication to initiate a soft PCI change from the first PCI 1315 to the second PCI 1316. For example, the scheduling entity 1300 may include an IAB donor node that may initiate the soft PCI change to a child L2 relay IAB node within an IAB network. As another example, the scheduling entity 1300 may be an L2 relay IAB node that autonomously determines to initiate the soft PCI change. In this example, the resource assignment and scheduling circuitry 1341 may be configured to schedule transmission of a message including a soft PCI change request to an IAB donor node within the IAB network.

The resource assignment and scheduling circuitry 1341 may further be configured to schedule one or more measurement objects to facilitate a handover of one or more RRC-connected scheduled entities from the first cell to the second cell. In some examples, the measurement object(s) may include SSB or CSI-RS resources that are associated with a beam direction corresponding to a latest serving beam direction in the first cell. In addition, the resource assignment and scheduling circuitry 1341 may further be configured to schedule transmission of a respective handover command (e.g., RRCReConfiguration message) to each of the RRC-connected scheduled entities. In some examples, the handover command may further include dedicated PRACH resources that may be associated with an SSB or CSI-RS beam direction corresponding to a latest serving beam direction in the first cell. In some examples, the scheduling entity 1300 may include an IAB donor node configured to schedule measurement objects and the handover command(s). In other examples, the scheduling entity 1300 may include an L2 relay IAB node that is performing the soft PCI transition from the first cell to the second cell.

The resource assignment and scheduling circuitry 1341 may further be configured to schedule transmission of updated system information (e.g., within a MIB/SIB1)

including a cell bar indication for the first cell. The resource assignment and scheduling circuitry 1341 may further be configured to schedule paging of one or more camped scheduled entities to notify the one or more camped scheduled entities of the system information change. The resource assignment and scheduling circuitry 1341 may further be configured to discontinue scheduling transmissions in the first cell after the transition period is over. The resource assignment and scheduling circuitry 1341 may further be configured to execute resource assignment and scheduling software 1351 included on the computer-readable medium 1306 to implement one or more functions described herein.

The processor 1304 may further include communication and processing circuitry 1342, configured to communicate with a set of one or more scheduled entities (e.g., UEs or child IAB nodes). In some examples, the communication and processing circuitry 1342 may include one or more hardware components that provide the physical structure that performs processes related to wireless communication (e.g., signal reception and/or signal transmission) and signal processing (e.g., processing a received signal and/or processing a signal for transmission).

In examples in which the scheduling entity 1300 is an IAB donor node that initiates a soft PCI change at an L2 relay IAB node, the communication and processing circuitry 1342 may be configured to generate and transmit, via the transceiver 1310, a message (e.g., RRC signal) to the L2 relay IAB node in the IAB network including a soft PCI change indication to initiate the soft PCI change from the first PCI 1315 to the second PCI 1316 within the L2 relay IAB node. In examples in which the scheduling entity 1300 is an L2 relay IAB node, the communication and processing circuitry 1342 may be configured to receive the soft PCI change indication and to store the second PCI 1316 included within the soft PCI change indication within memory 1305. In examples in which the scheduling entity 1300 is an L2 relay IAB node that autonomously initiates a soft PCI change, the communication and processing circuitry 1342 may be configured to generate and transmit, via the transceiver 1310, a soft PCI change request to an IAB donor node within the IAB network prior to receiving the soft PCI change indication with the second PCI 1316.

The communication and processing circuitry 1342 may further be configured to communicate with the set of one or more scheduled entities in both the first cell with the first PCI 1315 and the second cell with the second PCI 1316 during the transition period from the first PCI to the second PCI. For example, the communication and processing circuitry 1342 may be configured to generate and transmit, via the transceiver 1310, SSBs in the first cell and the second cell during the transition period, where the SSBs are separated in at least one of the frequency domain, the time domain, or the code domain. In addition, the communication and processing circuitry 1342 may be configured to generate and transmit, via the transceiver 1310, control information and/or user data traffic to the set of scheduled entities in both the first cell and the second cell during the transition period using orthogonally-scheduled resources in the first cell and the second cell.

The communication and processing circuitry 1342 may further be configured to transmit one or more reference signals (e.g., SSBs and/or CSI-RS) in the second cell corresponding to configured measurement objects during the transition period to facilitate handover measurements performed by RRC-connected scheduled entities. The communication and processing circuitry 1342 may further be configured to receive respective handover reports 1318 from RRC-connected scheduled entities in the first cell including the handover measurements performed by the RRC-connected scheduled entities in the second cell. The communication and processing circuitry 1342 may further store the received handover reports 1318 within, for example, memory 1305. In some examples, the communication and processing circuitry 1342 may further be configured to transmit the handover report(s) 1318 to the IAB donor node in the IAB network.

The communication and processing circuitry 1342 may further be configured to generate and transmit handover commands (e.g., RRCReConfiguration messages), via the transceiver 1310, to the RRC-connected scheduled entities to handover the RRC-connected scheduled entities from the first cell to the second cell. In some examples, the communication and processing circuitry 1342 may be configured to receive the handover commands from the IAB donor node and forward the handover commands to the RRC-connected scheduled entities. The communication and processing circuitry 1342 may further be configured to perform a respective RACH procedure in the second cell for each of the RRC-connected scheduled entities to handover the RRC-connected scheduled entities from the first cell to the second cell.

The communication and processing circuitry 1342 may further be configured to generate and transmit, via the transceiver 1310, updated system information (e.g., within a MIB/SIB1) including a cell bar indication for the first cell. The communication and processing circuitry 1342 may further be configured to page one or more camped scheduled entities to notify the one or more camped scheduled entities of the system information change. The communication and processing circuitry 1342 may further be configured to execute communication and processing software 1352 included on the computer-readable medium 1306 to implement one or more functions described herein.

The processor 1304 may further include soft PCI change circuitry 1343, configured to perform a soft PCI change from the first PCI 1315 to the second PCI 1316. In examples in which the scheduling entity 1300 is an IAB donor node, the soft PCI change circuitry 1343 may be configured to recognize a PCI collision between neighboring cells (e.g., neighboring IAB nodes) and to initiate a soft PCI change by one of the neighboring IAB nodes to change from the first PCI 1315 (colliding PCI) to the second PCI 1316. In this example, the soft PCI change circuitry 1343 may be configured to operate together with the communication and processing circuitry 1342 to generate and transmit a message including a soft PCI change indication with the second PCI 1316 to the IAB node experiencing the PCI collision.

In examples in which the scheduling entity is an L2 relay node experiencing a PCI collision, the soft PCI change circuitry 1343 may be configured to receive the message including the soft PCI change indication from the IAB donor node. In examples in which the scheduling entity 1300 is an RRC-enhanced IAB node experiencing a PCI collision, the soft PCI change circuitry 1343 may be configured to operate together with the communication and processing circuitry 1342 to generate and transmit a message including a soft PCI change request to the IAB donor node in the IAB network, requesting a new (second) PCI 1316. In this example, the soft PCI change circuitry 1343 may further be configured to receive the message including the soft PCI change indication with the second PCI 1316 from the IAB donor node.

The soft PCI change circuitry 1343 may further be configured to determine a transition period for the soft PCI change. In some examples, the transition period may correspond to a fixed predetermined period of time that may be set by the IAB node manufacturer, IAB network, or IAB donor node. In other examples, the transition period may corresponding to a variable period of time within which at least one scheduled entity of a set of scheduled entities in communication with the scheduling entity 1300 may be transferred from the first cell with the first PCI 1315 to the second cell with the second PCI 1316. In addition, the soft PCI change circuitry 1343 may be configured to operate together with the communication and processing circuitry 1342 and resource assignment and scheduling circuitry 1341 to discontinue transmission in the first cell after the transition period is over. In some examples, the soft PCI change circuitry 1343 may be configured to discontinue transmission in the first cell (e.g., cease operations in the first cell) after receipt of a respective handover complete message associated with each RRC-connected scheduled entity served by the scheduling entity 1300.

The soft PCI change circuitry 1343 may further be configured to enable the scheduling entity 1300 to communicate in both the first cell and the second cell during the transition period. For example, the soft PCI change circuitry 1343 may operate in coordination with the resource assignment and scheduling circuitry 1341 to schedule SSBs in the first cell and the second cell, separated in one or more of the frequency domain, time domain, or code domain. In addition, the soft PCI change circuitry 1343 may operate in coordination with the resource assignment and scheduling circuitry 1341 to allocate orthogonal resources in the first and second cells to communicate with the set of scheduled entities during the transition period. The soft PCI change circuitry 1343 may further be configured to control a power source 1320 to provide a different power level in each of the first and second cells. For example, the soft PCI change circuitry 1343 may be configured to utilize a first power level in the first cell and a second power level different than the first power level in the second cell during the transition period. In some examples, the second power level may be greater than the first power level.

The soft PCI change circuitry 1343 may further be configured to coordinate the transfer of the set of one or more scheduled entities from the first cell with the first PCI 1315 to the second cell with the second PCI 1316 during the transition period. In examples in which the scheduling entity 1300 is an IAB donor node, the soft PCI change circuitry 1343 may initiate the handover of one or more RRC-connected scheduled entities from the first cell to the second cell by configuring measurement objects, processing handover reports 1318, and generating respective handover commands for each of the RRC-connected scheduled entities. In examples in which the scheduling entity 1300 is an RRC-enhanced IAB node, the soft PCI change circuitry 1343 may be configured to initiate the handover of the RRC-connected scheduled entities by configuring measurement objects, processing handover reports 1318, and generating respective handover commands for each of the RRC-connected scheduled entities. In addition, the soft PCI change circuitry 1343 may further be configured to facilitate the re-selection by camped scheduled entities of the second cell by updating system information to indicate the first cell is barred and paging the camped scheduled entities. The soft PCI change circuitry 1343 may further be configured to execute soft PCI change software 1353 included on the computer-readable medium 1306 to implement one or more functions described herein.

The processor 1304 may further include handover management circuitry 1344, configured to manage handover of one or more RRC-connected scheduled entities from the first cell with the first PCI 1315 to the second cell with the second PCI 1316 during the transition period of the soft PCI change from the first PCI 1315 to the second PCI 1316. In examples in which the scheduling entity 1300 is an IAB donor node, the handover management circuitry 1344 may be configured to operate together with the resource assignment and scheduling circuitry 1341 to configure one or more measurement objects in the second cell and to trigger a handover measurement by each RRC-connected scheduled entity in the second cell utilizing the configured measurement object(s). The handover management circuitry 1344 may further include the second cell in a list (e.g., a "white list") of cells to be measured and provide this list to the RRC-connected scheduled entities. In this example, the handover management circuitry 1344 may further be configured to receive and process handover reports 1318 from the RRC-connected scheduled entities and to further generate handover commands for the RRC-connected scheduled entities. In some examples, the handover management circuitry 1344 may be configured to generate handover commands without configuring measurement objects or receiving/processing handover reports 1318. The handover management circuitry 1344 may further be configured to receive handover complete messages from the second cell and generate release commands to the first cell for each RRC-connected scheduled entity that successfully completes a handover to the second cell.

In examples in which the scheduling entity 1300 is the L2 relay node transitioning from the first PCI to the second PCI, the handover management circuitry 1344 may be configured to operate together with the communication and processing circuitry 1342 to generate and transmit one or more reference signals in the second cell corresponding to the configured measurement objects, receive handover reports 1318 via the first cell from RRC-connected scheduled entities that performed handover measurements utilizing the configured measurement objects, and provide the received handover reports 1318 to the IAB donor node. In addition, the handover management circuitry 1344 may be configured to receive handover commands from the IAB donor node and transmit the received handover commands to the RRC-connected scheduled entities via the first cell. The handover management circuitry 1344 may further be configured to perform RACH procedures with the RRC-connected scheduled entities via the second cell to handover the RRC-connected scheduled entities from the first cell to the second cell. The handover management circuitry 1344 may further be configured to receive handover complete messages from RRC-connected scheduled entities that successfully completed a handover to the second cell and to forward the handover complete messages to the IAB donor node.

In examples in which the scheduling entity 1300 is an RRC-enhanced IAB node transitioning from the first PCI 1315 to the second PCI 1316, the handover management circuitry 1344 may be configured to configure measurement objects in the second cell, trigger handover measurements by each RRC-connected scheduled entity in the second cell utilizing the configured measurement objects, receive and process handover reports 1318 from the RRC-connected scheduled entities, and generate handover commands for the RRC-connected scheduled entities. In some examples, the handover management circuitry 1344 may be configured to generate handover commands without configuring measurement objects or receiving/processing handover reports 1318. The handover management circuitry 1344 may further be configured to perform RACH procedures with each RRC-connected scheduled entity performing a handover to the second cell and to receive handover complete messages from each RRC-connected scheduled entity that successfully completed the handover. The handover management circuitry 1344 may further be configured to execute handover management software 1354 included on the computer-readable medium 1306 to implement one or more functions described herein.

The processor 1304 may further include cell bar implementation circuitry 1345, configured to update system information (e.g., MIB/SIB1) to set a cell bar indication indicating that the first cell is barred in the IAB network. The cell bar implementation circuitry 1345 may further be configured to page one or more camped scheduled entities camped onto the first cell to notify the camped scheduled entities of the change in system information. The cell bar implementation circuitry 1345 may further be configured to execute cell bar implementation software 1355 included on the computer-readable medium 1306 to implement one or more functions described herein.

Figure 14:
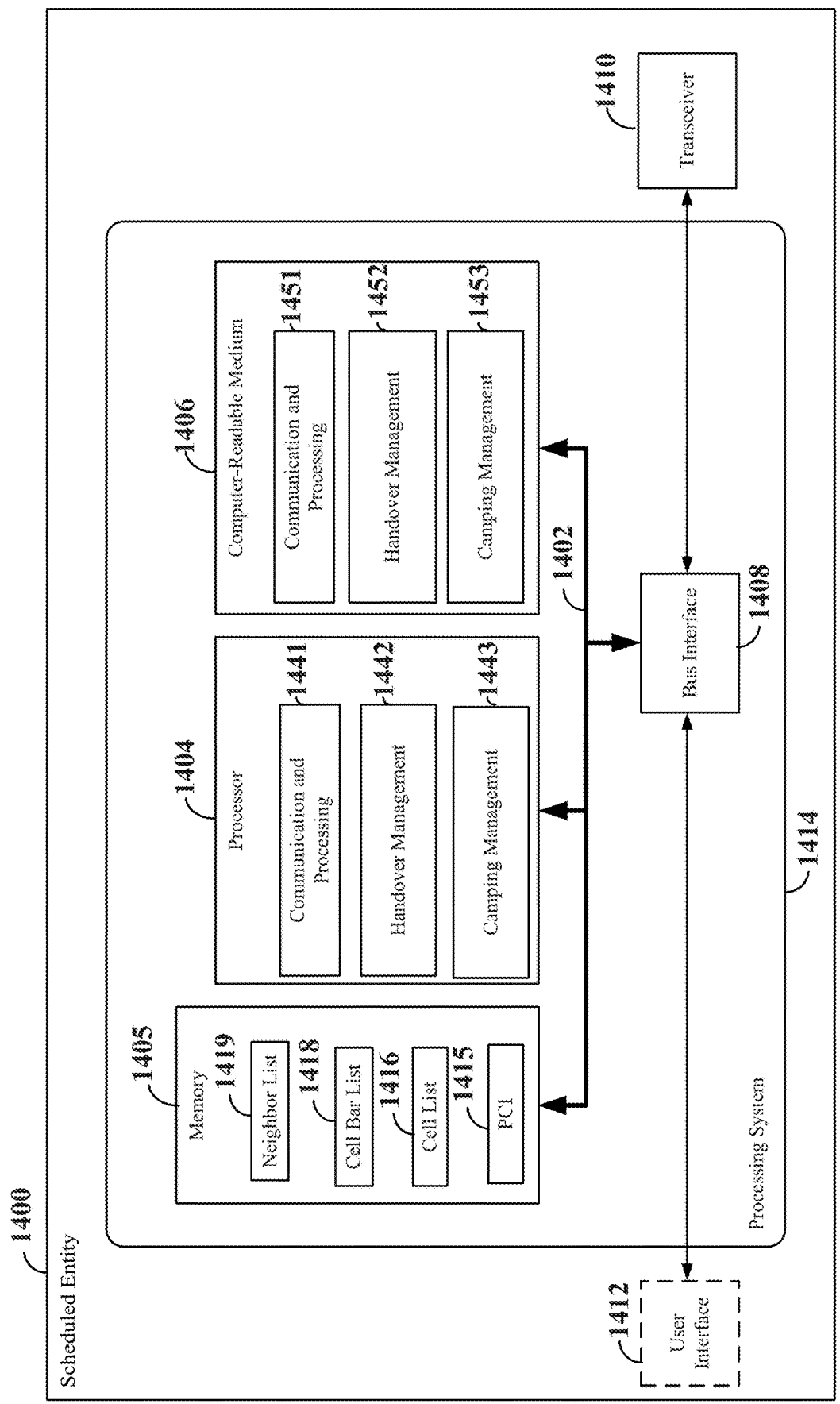
FIG. 14 is a block diagram illustrating an example of a hardware implementation for a scheduled entity employing a processing system according to some aspects.

FIG. 14 is a conceptual diagram illustrating an example of a hardware implementation for an exemplary scheduled entity 1400 employing a processing system 1414. In accordance with various aspects of the disclosure, an element, or any portion of an element, or any combination of elements may be implemented with a processing system 1414 that includes one or more processors 1404. For example, the scheduled entity 1400 may be a user equipment (UE), IAB node, or other type of scheduled entity as illustrated in FIGS. 1, 2, and 4-12.

The processing system 1414 may be substantially the same as the processing system 1314 illustrated in FIG. 13, including a bus interface 1408, a bus 1402, memory 1405, a processor 1404, and a computer-readable medium 1406. Furthermore, the scheduled entity 1400 may include an optional user interface 1412 and a transceiver 1410 substantially similar to those described above in FIG. 13. That is, the processor 1404, as utilized in a scheduled entity 1400, may be used to implement any one or more of the processes described below and illustrated in the various figures.

In some aspects of the disclosure, the processor 1404 may include communication and processing circuitry 1441, configured to communicate with a scheduling entity (e.g., gNB, eNB, or parent IAB node). In some examples, the communication and processing circuitry 1441 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1441 may be configured to communicate with a scheduling entity transitioning from a first PCI associated with a first cell currently serving the scheduled entity 1400 to a second PCI associated with a second cell during a transition period of a soft PCI change. The first and second PCIs 1415 may be stored, for example, in memory 1405. For example, the communication and processing circuitry 1441 may be configured to receive an SSB including the first PCI 1415 in the first cell served by the scheduling entity and to store the first PCI 1415 of the first cell (e.g., the PCI of the serving cell) within, for example, memory 1405. The communication and processing circuitry 1441 may further be configured to receive and process one or more SSBs including the second PCI 1415 in the second cell served by the scheduling entity during the transition period and store the second PCI 1415 within, for example, memory 1405. In some examples, the SSBs transmitted in the first and second cells are separated in at least one of the frequency domain, the time domain, or the code domain. In addition, the communication and processing circuitry 1441 may be configured to communicate control information and/or user data traffic with the scheduling entity during the transition period via one of the first cell or the second cell. In some examples, resources allocated in each of the first cell and the second cell may be orthogonal to reduce interference between the first and second cells. The communication and processing circuitry 1441 may further be configured to execute communication and processing software 1451 included on the computer-readable medium 1406 to implement one or more functions described herein.

The processor 1404 may further include handover management circuitry 1442, configured to receive and process one or more reference signals (e.g., SSBs and/or CSI-RS) in the second cell corresponding to configured measurement objects during the transition period and to perform handover measurements of the one or more reference signals. For example, the handover management circuitry 1442 may be configured to measure the RSRP of the one or more reference signals. In some examples, the one or more reference signals may be received over resources associated with a beam direction corresponding to a latest serving beam direction in the first cell. Measurement of the one or more reference signals may be based on a cell list 1416 including a list of cells to be measured. The cell list 1416 may be provided to the scheduled entity 1400 via the scheduling entity and stored, for example, within memory 1405. For example, the cell list 1416 may be a "white list" including the second cell and the scheduling entity (or IAB donor node) may set a corresponding flag in the cell list 1416 (e.g., via RRC signaling) so that only cells in the "white list" are measured by the scheduled entity 1400.

The handover management circuitry 1442 may further be configured to generate and transmit a handover report to the scheduling entity. The handover report may include, for example, the second PCI of the second cell, an index of the reference signal (e.g., an SSB index or CSI-RS index) with the highest measured RSRP, and a measurement value (e.g., the RSRP) associated with the reference signal. In addition, the handover management circuitry 1442 may be configured to receive and process a handover command (e.g., RRCReConfiguration message) indicating that the scheduled entity 1400 should perform a handover from the first cell to the second cell. In some examples, the handover command may include dedicated PRACH resources for the scheduled entity to perform the handover. The dedicated PRACH resources may be associated with an SSB and/or CSI-RS beam direction corresponding to the latest serving beam direction in the first cell. The handover management circuitry 1442 may further be configured to perform a RACH procedure in the second cell to handover from the first cell to the second cell and to transmit a handover complete message to the scheduling entity. The handover management circuitry 1442 may further be configured to execute handover management software 1452 included on the computer-readable medium 1406 to implement one or more functions described herein.

The processor 1404 may further include camping management circuitry 1443, configured to camp onto the first cell with the first PCI served by the scheduling entity when in idle or inactive mode. The camping management circuitry 1443 may further be configured to receive and process a page from the scheduling entity indicating a change in system information. The camping management circuitry 1443 may then be configured to receive and process updated system information (e.g., within a MIB/SIB1) including a cell bar indication for the first cell. Upon receiving the updated system information indicating the first cell is barred, the camping management circuitry 1443 may further be configured to update a cell bar list 1418, which may be stored, for example in memory 1405 with the PCI of the first cell. The camping management circuitry 1443 may further be configured to select the second cell with the second PCI served by the scheduling entity and camp onto the second cell. In some examples, the second cell with the second PCI may be included in a neighbor list 1419 (e.g., which may be stored in memory 1405) for cell selection to enable the camped scheduled entity to select the second cell to camp onto. The neighbor list 1419 may include one or more parameters associated with each cell in the neighbor list 1419. In some examples, one or more of the parameters indicated for the second cell may be more favorable than other cells in the neighbor list 1419 to facilitate selection of the second cell. The camping management circuitry 1443 may further be configured to execute camping software 1453 included on the computer-readable medium 1406 to implement one or more functions described herein.

Figure 15:
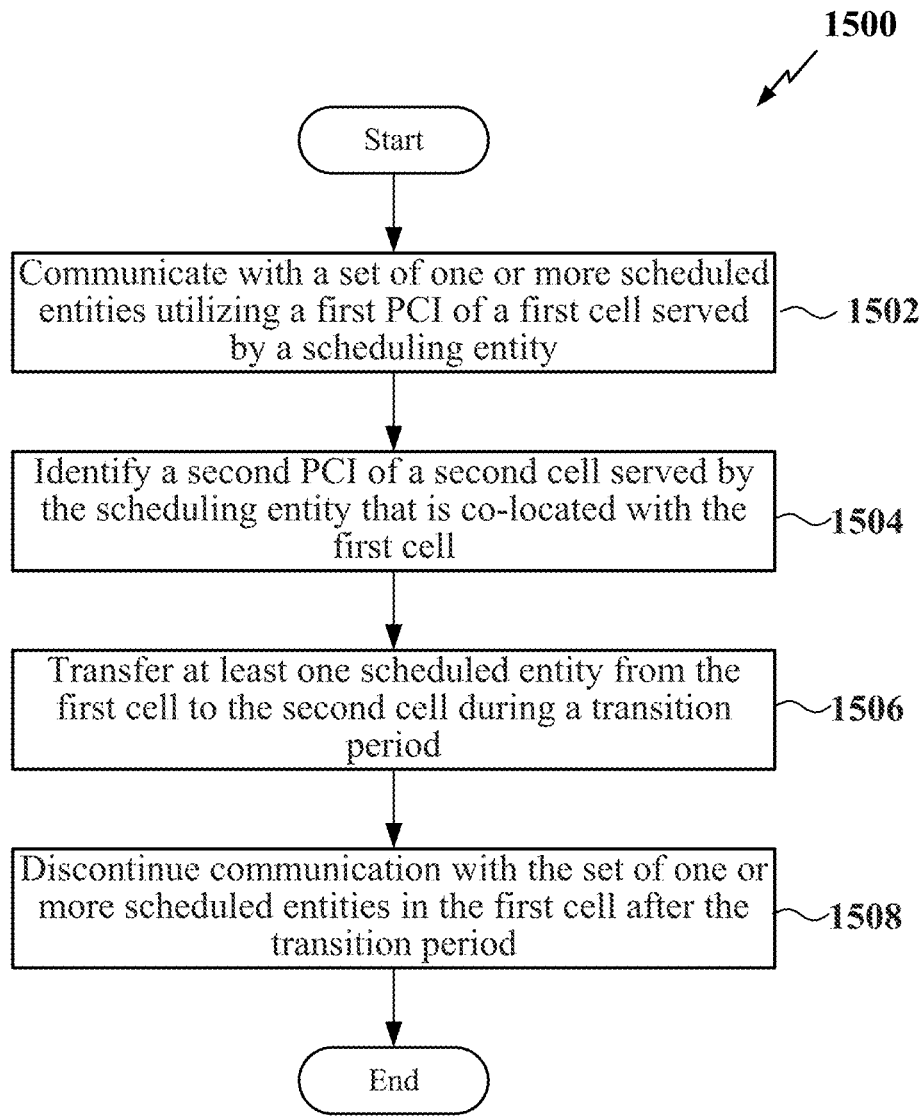
FIG. 15 is a flow chart illustrating an exemplary process for performing a soft PCI change according to some aspects.

FIG. 15 is a flow chart illustrating an exemplary process 1500 for performing a soft PCI change at a scheduling entity according to some aspects of the disclosure. As described below, some or all illustrated features may be omitted in a particular implementation within the scope of the present disclosure, and some illustrated features may not be required for implementation of all embodiments. In some examples, the process 1500 may be carried out by the scheduling entity illustrated in FIG. 13. For example, the scheduling entity may include a gNB, eNB, or parent IAB node within an IAB network. In some examples, the process 1500 may be carried out by any suitable apparatus or means for carrying out the functions or algorithm described below.

At block 1502, the scheduling entity may communicate with a set of one or more scheduled entities (e.g., UEs and/or child IAB nodes) utilizing a first PCI of a first cell served by the scheduling entity. For example, the resource assignment and scheduling circuitry 1341 and communication and processing circuitry 1342, together with the transceiver 1310, shown and described above in connection with FIG. 13 may provide a means to communicate with the set of scheduled entities.

At block 1504, the scheduling entity may identify a second PCI of a second cell served by the scheduling entity that is co-located with the first cell. In some examples, the scheduling entity may receive a soft PCI change indication from an IAB donor node in the IAB network including the second PCI to initiate a soft PCI change within the scheduling entity from the first PCI to the second PCI. In some examples, the scheduling entity may initially transmit a soft PCI change request to the IAB donor node, requesting the second PCI upon recognizing a PCI collision involving the first PCI with a neighboring IAB node. For example, the soft PCI change circuitry 1343 shown and described above in connection with FIG. 13 may provide a means to identify the second PCI.

At block 1506, the scheduling entity may transfer at least one scheduled entity of the set of one or more scheduled entities from the first cell to the second cell during a transition period defined by the soft PCI change. In some examples, the scheduling entity may transmit a first synchronization signal block (SSB) in the first cell and a second SSB in the second cell during the transition period. Here, the first SSB and the second SSB are separated in at least one of a time domain, a frequency domain, or a code domain. The scheduling entity may further allocate orthogonal resources between the first cell and the second cell for communication with the set of one or more scheduled entities during the transition period. In addition, the scheduling entity may utilize a PRACH configuration of the first cell in the second cell during the transition period and discontinue monitoring the PRACH in the first cell upon entering the transition period. In some examples, the scheduling entity may utilize a first power level in the first cell and a second power level in the second cell during the transition period. For example, the second power level can be greater than the first power level.

In some examples, the scheduling entity may handover at least one RRC-connected scheduled entity from the first cell to the second cell during the transition period. For example, the scheduling entity may configure one or more cell measurements for the RRC-connected scheduled entity. In one example, the scheduling entity may include the second cell in a list of cells to be measured and provide the list of cells to be measured to the RRC-connected scheduled entity. In some examples, the scheduling entity may allocate resources for transmission of a reference signal in the second cell. The resources may include a beam direction corresponding to a latest serving beam direction utilized in the first cell for the RRC-connected scheduled entity. The scheduling entity may then transmit the reference signal in the second cell and receive a handover report from the RRC-connected scheduled entity based on the reference signal. The handover report may include the second PCI of the second cell, an index of the reference signal, and a measurement value associated with the reference signal.

In some examples, the scheduling entity may transmit a handover command to the RRC-connected scheduled entity without at least one of configuration of handover measurements or receipt of a handover report. In this example, the handover command can include dedicated PRACH resources for the RRC-connected scheduled entity to utilize in performing a RACH procedure with the second cell. The PRACH resources may include a beam direction corresponding to a latest serving beam direction utilized in the first cell for communication with the RRC-connected scheduled entity.

In some examples, the scheduling entity may enable one or more camped scheduled entities to re-select and camp onto the second cell during the transition period by updating the system information to set a cell bar indication for the first cell. In some examples, the transition period has a fixed duration predetermined by the scheduling entity, the IAB network, or another node (e.g., an IAB donor node) within the IAB network. In other examples, the transition period has a variable duration corresponding to an amount of time required to handover at least one of the RRC-connected scheduled entities to the second cell. In an example, the transition period may end when the scheduling entity receives a release command for the last RRC-connected scheduled entity in the first cell. For example, the soft PCI change circuitry 1343, together with at least one of the handover management circuitry 1344 and the cell bar implementation circuitry 1345, shown and described above in connection with FIG. 13 may provide a means to transfer at least one scheduled entity from the first cell to the second cell during the transition period.

At block 1508, the scheduling entity may discontinue communication with the set of one or more scheduled entities in the first cell after the transition period. For example, the soft PCI change circuitry 1343, together with the resource assignment and scheduling circuitry 1341, shown and described above in connection with FIG. 13 may provide a means to discontinue communication with the set of one or more scheduled entities after the transition period.

Figure 16:
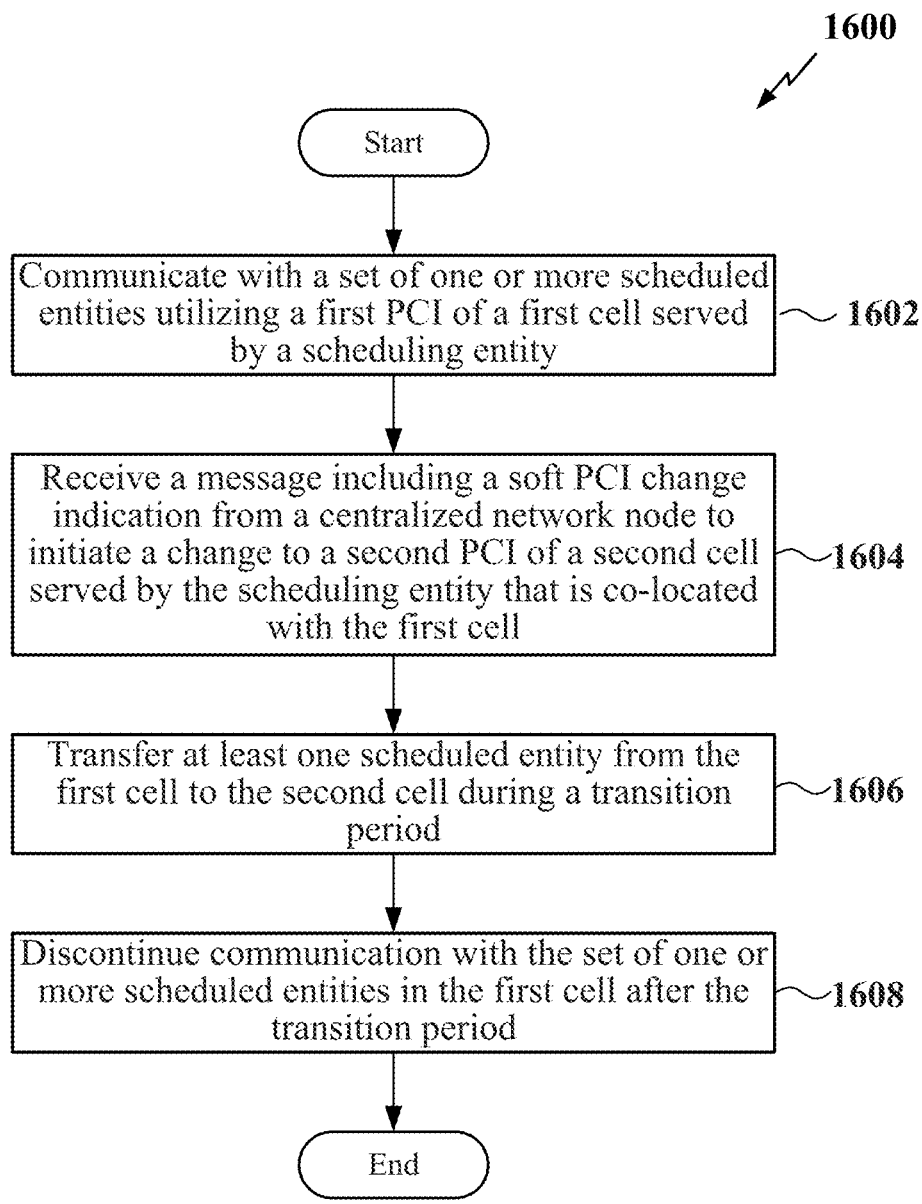
FIG. 16 is a flow chart illustrating another exemplary process for performing a soft PCI change according to some aspects.

FIG. 16 is a flow chart illustrating another exemplary process 1600 for performing a soft PCI change at a scheduling entity according to some aspects of the disclosure. As described below, some or all illustrated features may be omitted in a particular implementation within the scope of the present disclosure, and some illustrated features may not be required for implementation of all embodiments. In some examples, the process 1600 may be carried out by the scheduling entity illustrated in FIG. 13. For example, the scheduling entity may include a gNB, eNB, or parent IAB node within an IAB network. In some examples, the process 1600 may be carried out by any suitable apparatus or means for carrying out the functions or algorithm described below.

At block 1602, the scheduling entity may communicate with a set of one or more scheduled entities (e.g., UEs and/or child IAB nodes) utilizing a first PCI of a first cell served by the scheduling entity. For example, the resource assignment and scheduling circuitry 1341 and communication and processing circuitry 1342, together with the transceiver 1310, shown and described above in connection with FIG. 13 may provide a means to communicate with the set of scheduled entities.

At block 1604, the scheduling entity may receive a message including a soft PCI change indication from a centralized network node (e.g., an IAB donor node in the IAB network) to initiate a soft PCI change within the scheduling entity from the first PCI to a second PCI of a second cell served by the scheduling entity. Here, the first cell and second cell are co-located. For example, the soft PCI change circuitry 1343 and communication and processing circuitry 1342, together with the transceiver 1310, shown and described above in connection with FIG. 13 may provide a means to receive the soft PCI change indication including the second PCI.

At block 1606, the scheduling entity may transfer at least one scheduled entity of the set of one or more scheduled entities from the first cell to the second cell during a transition period defined by the soft PCI change. For example, the scheduling entity may handover at least one RRC-connected scheduled entity from the first cell to the second cell during the transition period. In addition, the scheduling entity may enable one or more camped scheduled entities to re-select and camp onto the second cell during the transition period by updating the system information to set a cell bar indication for the first cell. In some examples, the transition period has a fixed duration predetermined by the scheduling entity, the IAB network, or another node (e.g., an IAB donor node) within the IAB network. In other examples, the transition period has a variable duration corresponding to an amount of time required to handover at least one of the RRC-connected scheduled entities to the second cell. In an example, the transition period may end when the scheduling entity receives a release command for the last RRC-connected scheduled entity in the first cell. For example, the soft PCI change circuitry 1343, together with at least one of the handover management circuitry 1344 and the cell bar implementation circuitry 1345, shown and described above in connection with FIG. 13 may provide a means to transfer at least one scheduled entity from the first cell to the second cell during the transition period.

At block 1608, the scheduling entity may discontinue communication with the set of one or more scheduled entities in the first cell after the transition period. For example, the soft PCI change circuitry 1343, together with the resource assignment and scheduling circuitry 1341, shown and described above in connection with FIG. 13 may provide a means to discontinue communication with the set of one or more scheduled entities after the transition period.

Figure 17:
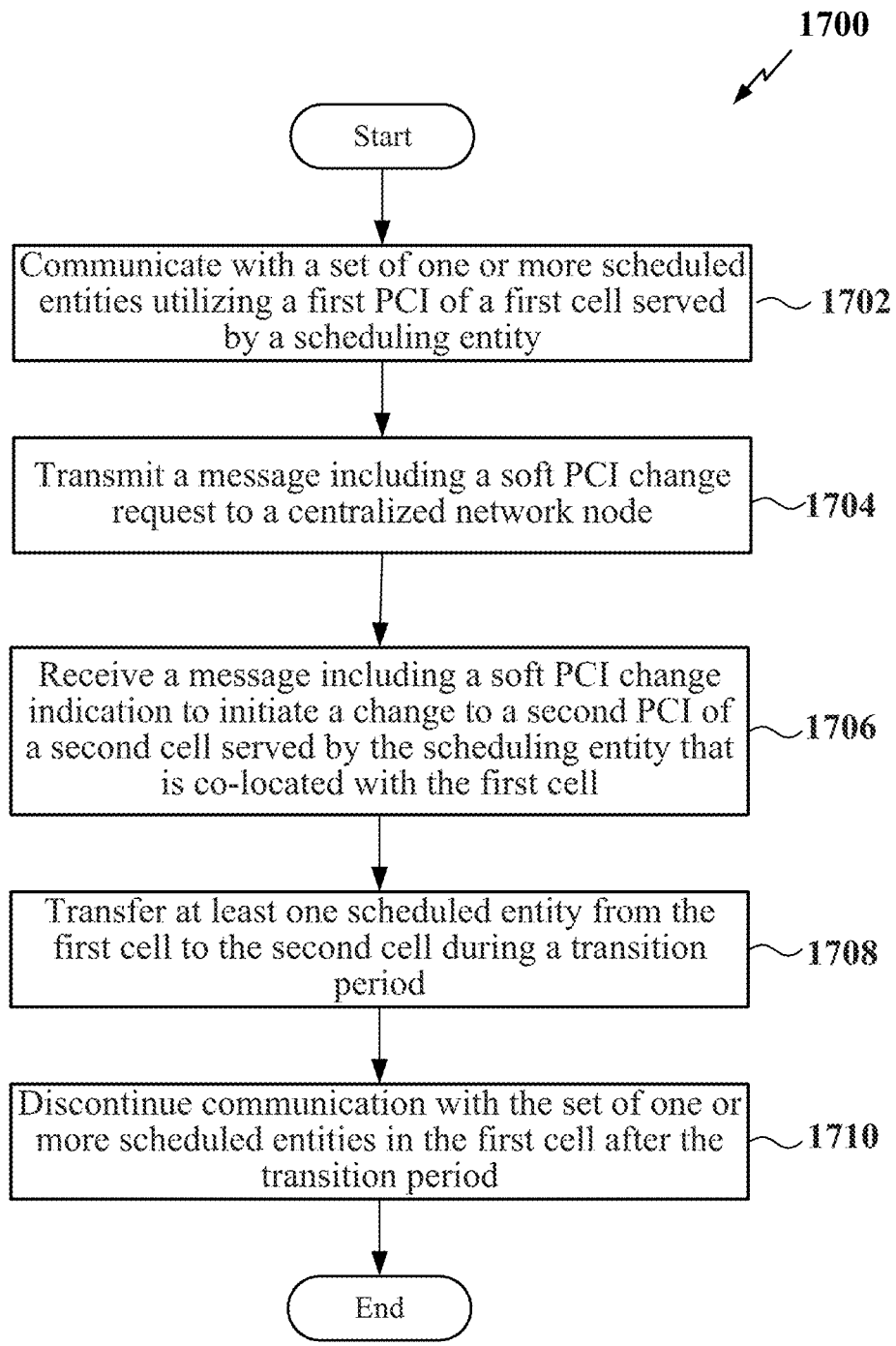
FIG. 17 is a flow chart illustrating another exemplary process for performing a soft PCI change according to some aspects.

FIG. 17 is a flow chart illustrating another exemplary process 1700 for performing a soft PCI change at a scheduling entity according to some aspects of the disclosure. As described below, some or all illustrated features may be omitted in a particular implementation within the scope of the present disclosure, and some illustrated features may not be required for implementation of all embodiments. In some examples, the process 1700 may be carried out by the scheduling entity illustrated in FIG. 13. For example, the scheduling entity may include a gNB, eNB, or parent IAB node within an IAB network. In some examples, the process 1700 may be carried out by any suitable apparatus or means for carrying out the functions or algorithm described below.

At block 1702, the scheduling entity may communicate with a set of one or more scheduled entities (e.g., UEs and/or child IAB nodes) utilizing a first PCI of a first cell served by the scheduling entity. For example, the resource assignment and scheduling circuitry 1341 and communication and processing circuitry 1342, together with the transceiver 1310, shown and described above in connection with FIG. 13 may provide a means to communicate with the set of scheduled entities.

At block 1704, the scheduling entity may transmit a message including a soft PCI change request to a centralized network node (e.g., an IAB donor node in the IAB network). In some examples, the scheduling entity may transmit the soft PCI change request to the IAB donor node upon recognizing a PCI collision involving the first PCI with a neighboring IAB node. For example, the soft PCI change circuitry 1343 shown and described above in connection with FIG. 13 may provide a means to transmit the soft PCI change request.

At block 1706, the scheduling entity may receive a message including a soft PCI change indication from the IAB donor node in the IAB network to initiate a soft PCI change within the scheduling entity from the first PCI to a second PCI of a second cell served by the scheduling entity. Here, the first cell and second cell are co-located. For example, the soft PCI change circuitry 1343 and communication and processing circuitry 1342, together with the transceiver 1310, shown and described above in connection with FIG. 13 may provide a means to receive the soft PCI change indication including the second PCI.

At block 1708, the scheduling entity may transfer at least one scheduled entity of the set of one or more scheduled entities from the first cell to the second cell during a transition period defined by the soft PCI change. For example, the scheduling entity may handover at least one RRC-connected scheduled entity from the first cell to the second cell during the transition period. In addition, the scheduling entity may enable one or more camped scheduled entities to re-select and camp onto the second cell during the transition period by updating the system information to set a cell bar indication for the first cell. In some examples, the transition period has a fixed duration predetermined by the scheduling entity, the IAB network, or another node (e.g., an IAB donor node) within the IAB network. In other examples, the transition period has a variable duration corresponding to an amount of time required to handover at least one of the RRC-connected scheduled entities to the second cell. In an example, the transition period may end when the scheduling entity receives a release command for the last RRC-connected scheduled entity in the first cell. For example, the soft PCI change circuitry 1343, together with at least one of the handover management circuitry 1344 and the cell bar implementation circuitry 1345, shown and described above in connection with FIG. 13 may provide a means to transfer at least one scheduled entity from the first cell to the second cell during the transition period.

At block 1710, the scheduling entity may discontinue communication with the set of one or more scheduled entities in the first cell after the transition period. For example, the soft PCI change circuitry 1343, together with the resource assignment and scheduling circuitry 1341, shown and described above in connection with FIG. 13 may provide a means to discontinue communication with the set of one or more scheduled entities after the transition period.

Figure 18:
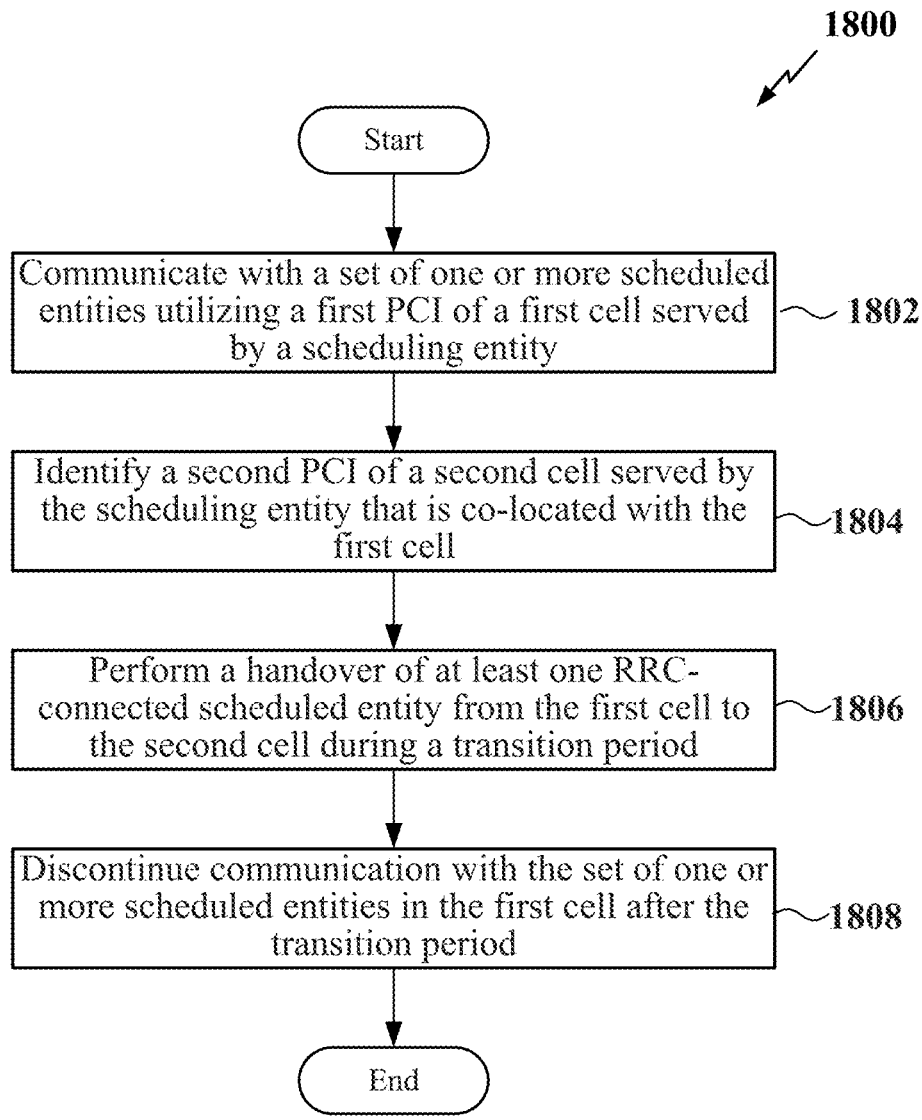
FIG. 18 is a flow chart illustrating another exemplary process for performing a soft PCI change according to some aspects.

FIG. 18 is a flow chart illustrating another exemplary process 1800 for performing a soft PCI change at a scheduling entity according to some aspects of the disclosure. As described below, some or all illustrated features may be omitted in a particular implementation within the scope of the present disclosure, and some illustrated features may not be required for implementation of all embodiments. In some examples, the process 1800 may be carried out by the scheduling entity illustrated in FIG. 13. For example, the scheduling entity may include a gNB, eNB, or parent IAB node within an IAB network. In some examples, the process 1800 may be carried out by any suitable apparatus or means for carrying out the functions or algorithm described below.

At block 1802, the scheduling entity may communicate with a set of one or more scheduled entities (e.g., UEs and/or child IAB nodes) utilizing a first PCI of a first cell served by the scheduling entity. For example, the resource assignment and scheduling circuitry 1341 and communication and processing circuitry 1342, together with the transceiver 1310, shown and described above in connection with FIG. 13 may provide a means to communicate with the set of scheduled entities.

At block 1804, the scheduling entity may identify a second PCI of a second cell served by the scheduling entity that is co-located with the first cell. In some examples, the scheduling entity may receive a soft PCI change indication from an IAB donor node in the IAB network including the second PCI to initiate a soft PCI change within the scheduling entity from the first PCI to the second PCI. In some examples, the scheduling entity may initially transmit a soft PCI change request to the IAB donor node, requesting the second PCI upon recognizing a PCI collision involving the first PCI with a neighboring IAB node. For example, the soft PCI change circuitry 1343 shown and described above in connection with FIG. 13 may provide a means to identify the second PCI.

At block 1806, the scheduling entity may perform a handover of at least one RRC-connected scheduled entity from the first cell to the second cell during a transition period. In some examples, the transition period has a fixed duration predetermined by the scheduling entity, the IAB network, or another node (e.g., an IAB donor node) within the IAB network. In other examples, the transition period has a variable duration corresponding to an amount of time required to handover at least one of the RRC-connected scheduled entities to the second cell. In an example, the transition period may end when the scheduling entity receives a release command for the last RRC-connected scheduled entity in the first cell. For example, the soft PCI change circuitry 1343, together with the handover management circuitry 1344, shown and described above in connection with FIG. 13 may provide a means to perform the handover.

At block 1808, the scheduling entity may discontinue communication with the set of one or more scheduled entities in the first cell after the transition period. For example, the soft PCI change circuitry 1343, together with the resource assignment and scheduling circuitry 1341, shown and described above in connection with FIG. 13 may provide a means to discontinue communication with the set of one or more scheduled entities after the transition period.

Figure 19:
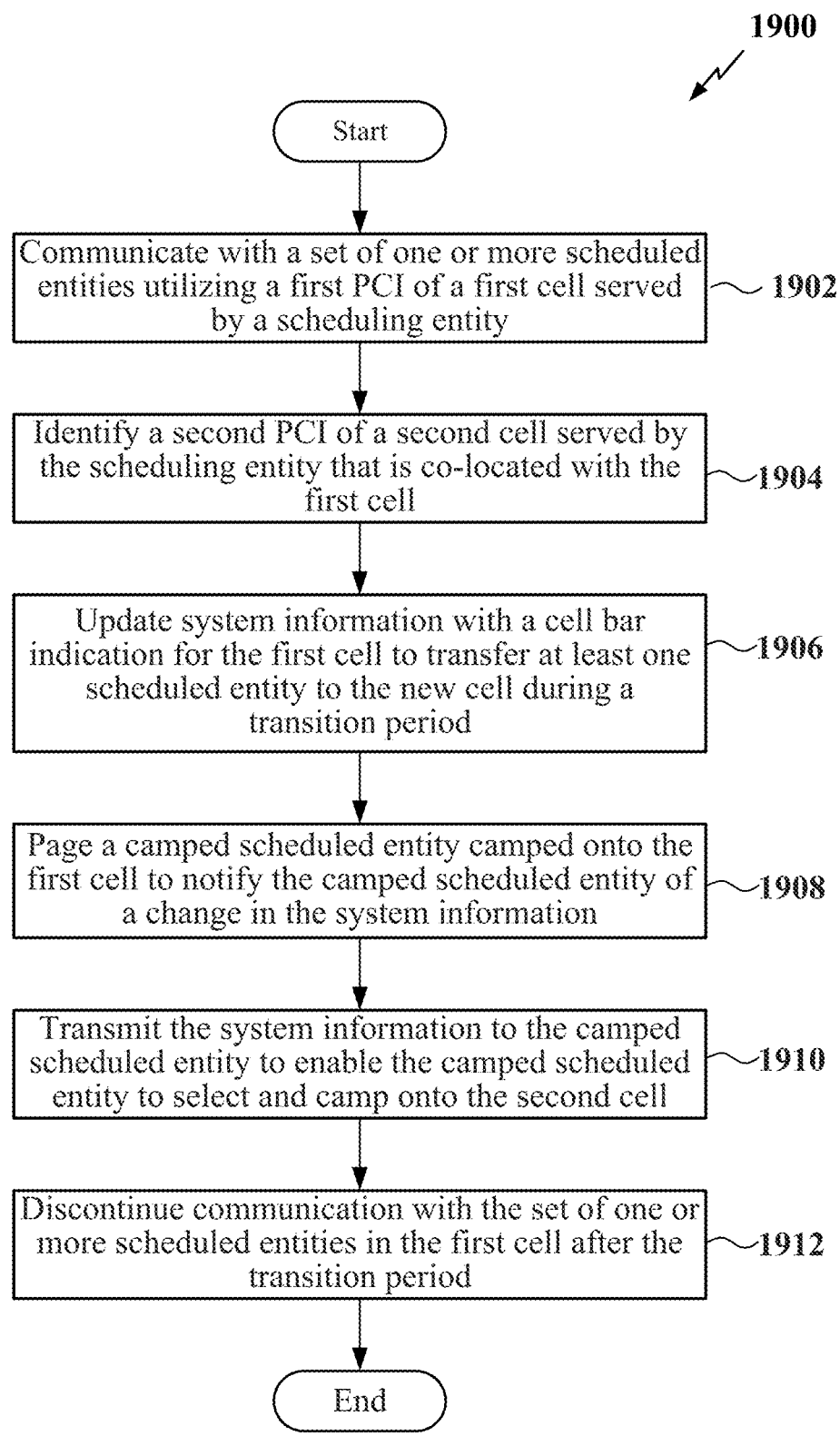
FIG. 19 is a flow chart illustrating another exemplary process for performing a soft PCI change according to some aspects.

FIG. 19 is a flow chart illustrating another exemplary process 1900 for performing a soft PCI change at a scheduling entity according to some aspects of the disclosure. As described below, some or all illustrated features may be omitted in a particular implementation within the scope of the present disclosure, and some illustrated features may not be required for implementation of all embodiments. In some examples, the process 1900 may be carried out by the scheduling entity illustrated in FIG. 13. For example, the scheduling entity may include a gNB, eNB, or parent IAB node within an IAB network. In some examples, the process 1900 may be carried out by any suitable apparatus or means for carrying out the functions or algorithm described below.

At block 1902, the scheduling entity may communicate with a set of one or more scheduled entities (e.g., UEs and/or child IAB nodes) utilizing a first PCI of a first cell served by the scheduling entity. For example, the resource assignment and scheduling circuitry 1341 and communication and processing circuitry 1342, together with the transceiver 1310, shown and described above in connection with FIG. 13 may provide a means to communicate with the set of scheduled entities.

At block 1904, the scheduling entity may identify a second PCI of a second cell served by the scheduling entity that is co-located with the first cell. In some examples, the scheduling entity may receive a soft PCI change indication from an IAB donor node in the IAB network including the second PCI to initiate a soft PCI change within the scheduling entity from the first PCI to the second PCI. In some examples, the scheduling entity may initially transmit a soft PCI change request to the IAB donor node, requesting the second PCI upon recognizing a PCI collision involving the first PCI with a neighboring IAB node. For example, the soft PCI change circuitry 1343 shown and described above in connection with FIG. 13 may provide a means to identify the second PCI.

At block 1906, the scheduling entity may update system information with a cell bar indication for the first cell to transfer at least one scheduled entity to the new cell during a transition period. For example, the soft PCI change circuitry 1343, together with the cell bar implementation circuitry 1345, shown and described above in connection with FIG. 13 may provide a means to update system information with the cell bar indication.

At block 1908, the scheduling entity may page a camped scheduled entity of the set of one or more scheduled entities camped onto the first cell to notify the camped scheduled entity of a change in the system information. For example, the soft PCI change circuitry 1343, together with the communication and processing circuitry 1342 and the transceiver 1310, shown and described above in connection with FIG. 13 may provide a means to page a camped scheduled entity.

At block 1910, the scheduling entity may transmit the system information to the camped scheduled entity to enable the camped scheduled entity to select and camp onto the second cell. For example, the communication and processing circuitry 1342 together with the transceiver 1310 shown and described above in connection with FIG. 13 may provide a means to transmit the system information to the camped scheduled entity.

At block 1912, the scheduling entity may discontinue communication with the set of one or more scheduled entities in the first cell after the transition period. For example, the soft PCI change circuitry 1343, together with the resource assignment and scheduling circuitry 1341, shown and described above in connection with FIG. 13 may provide a means to discontinue communication with the set of one or more scheduled entities after the transition period.

In one configuration, a scheduling entity 1300 includes means for communicating with a set of one or more scheduled entities utilizing a first physical cell identifier (PCI) of a first cell served by the scheduling entity and means for identifying a second PCI of a second cell served by the scheduling entity. The first cell and the second cell can be co-located. The scheduling entity further includes means for transferring at least one scheduled entity of the set of one or more scheduled entities from the first cell to the second cell during a transition period, and means for discontinuing communication with the set of one or more scheduled entities in the first cell after the transition period.

In one aspect, the aforementioned means for communicating with a set of one or more scheduled entities utilizing a first physical cell identifier (PCI) of a first cell served by the scheduling entity, means for identifying a second PCI of a second cell served by the scheduling entity, means for transferring at least one scheduled entity of the set of one or more scheduled entities from the first cell to the second cell during a transition period, and means for discontinuing communication with the set of one or more scheduled entities in the first cell after the transition period may be the processor(s) 1304 shown in FIG. 13 configured to perform the functions recited by the aforementioned means.

For example, the aforementioned means for communicating with a set of one or more scheduled entities utilizing a first PCI may include the resource assignment and scheduling circuitry 1341, communication and processing circuitry 1342, and the transceiver 1310 shown in FIG. 13. As another example, the aforementioned means for identifying a second PCI of a second cell served by the scheduling entity may include the soft PCI change circuitry 1343 shown in FIG. 13. In another example, the aforementioned means for transferring at least one scheduled entity of the set of one or more scheduled entities from the first cell to the second cell during a transition period may include the soft PCI change circuitry 1343, together with at least one of the handover management circuitry 1344 and the cell bar implementation circuitry 1345, shown in FIG. 13. In another example, the aforementioned means for discontinuing communication with the set of one or more scheduled entities in the first cell after the transition period may include the soft PCI change circuitry 1343 and the resource assignment and scheduling circuitry 1341 shown in FIG. 13. In another aspect, the aforementioned means may be a circuit or any apparatus configured to perform the functions recited by the aforementioned means.

The following provides an overview of examples of the present disclosure.

Example 1: A method of wireless communication at a scheduling entity, comprising: communicating with a set of one or more scheduled entities utilizing a first physical cell identifier (PCI) of a first cell served by the scheduling entity; identifying a second PCI of a second cell served by the scheduling entity, wherein the first cell and the second cell are co-located; transferring at least one scheduled entity of the set of one or more scheduled entities from the first cell to the second cell during a transition period; and discontinuing communication with the set of one or more scheduled entities in the first cell after the transition period.

Example 2: The method of example 1, further comprising: transmitting a first synchronization signal block (SSB) in the first cell and a second SSB in the second cell during the transition period, wherein the first SSB and the second SSB are separated in at least one of a time domain, a frequency domain, or a code domain.

Example 3: The method of example 1 or 2, further comprising: allocating orthogonal resources between the first cell and the second cell for communication with the set of one or more scheduled entities during the transition period.

Example 4: The method of any of examples 1 through 3, further comprising: utilizing a physical random access channel (PRACH) configuration of the first cell in the second cell during the transition period; and discontinuing monitoring the PRACH in the first cell upon entering the transition period.

Example 5: The method of any of examples 1 through 4, further comprising: utilizing a first power level in the first cell and a second power level in the second cell during the transition period, wherein the second power level is greater than the first power level.

Example 6: The method of any of examples 1 through 5, wherein the identifying the second PCI of the second cell further comprises: receiving a first message comprising a soft PCI change indication to change from the first PCI to the second PCI over the transition period from a centralized network node.

Example 7: The method of any of examples 1 through 6, further comprising: transmitting a second message comprising a soft PCI change request to the centralized network node.

Example 8: The method of any of examples 1 through 7, wherein the scheduling entity comprises an integrated-access-backhaul (IAB) node and the centralized network node comprises an IAB donor node central unit, a network entity configured for PCI management, or a base station comprising a coverage area greater than a coverage area of the scheduling entity.

Example 9: The method of any of examples 1 through 8, wherein the transferring the set of one or more scheduled entities further comprises: performing a handover of a radio resource control (RRC)-connected scheduled entity of the set of one or more scheduled entities from the first cell to the second cell during the transition period.

Example 10: The method of any of examples 1 through 9, wherein the performing the handover further comprises: configuring one or more cell measurements for the RRC-connected scheduled entity of the second cell.

Example 11: The method of any of examples 1 through 10, wherein the configuring the one or more cell measurements further comprises: including the second cell in a list of cells to be measured; and providing the list of cells to be measured to the RRC-connected scheduled entity.

Example 12: The method of any of examples 1 through 11, further comprising: allocating resources for transmission of a reference signal in the second cell, wherein the resources comprise a beam direction corresponding to a latest serving beam direction utilized in the first cell for the RRC-connected scheduled entity; transmitting the reference signal in the second cell; and receiving a handover report from the RRC-connected scheduled entity based on the reference signal.

Example 13: The method of any of examples 1 through 12, wherein the handover report comprises the second PCI of the second cell, an index of the reference signal, and a measurement value associated with the reference signal.

Example 14: The method of any of examples 1 through 13, wherein the performing the handover further comprises: transmitting a handover command to the RRC-scheduled entity without at least one of configuration of handover measurements or receipt of a handover report.

Example 15: The method of any of examples 1 through 14, wherein the handover command comprises dedicated physical random access channel (PRACH) resources for the RRC-connected scheduled entity to utilize in performing a RACH procedure with the second cell, wherein the PRACH resources comprise a beam direction corresponding to a latest serving beam direction utilized in the first cell for communication with the RRC-connected scheduled entity.

Example 16: The method of any of examples 1 through 15, wherein the transferring the set of one or more scheduled entities further comprises: updating system information with a cell bar indication for the first cell; paging a camped scheduled entity of the set of one or more scheduled entities camped onto the first cell to notify the camped scheduled entity of a change in the system information; and transmitting the system information to the camped scheduled entity to enable the camped scheduled entity to select and camp onto the second cell.

Example 17: The method of any of examples 1 through 16, wherein the transition period comprises a predetermined duration of time or a variable duration of time within which the least one scheduled entity of the set of one or more scheduled entities is transferred from the first cell to the second cell.

Example 18: A scheduling entity in a wireless communication network comprising a transceiver, a memory, and a processor communicatively coupled to the transceiver and the memory, the processor and memory configured to perform a method of any one of examples 1 through 17.

Example 19: A scheduling entity in a wireless communication network comprising means for performing a method of any one of examples 1 through 17.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, and 4-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a scheduling entity, comprising:
communicating with a set of one or more scheduled entities utilizing a first physical cell identifier (PCI) of a first cell served by the scheduling entity;
receiving from a centralized network node a first message comprising a soft PCI change indication to change from utilizing the first PCI of the first cell to utilizing a second PCI of a second cell served by the scheduling entity over a transition period, wherein the first cell and the second cell are co-located;
transferring at least one scheduled entity of the set of one or more scheduled entities to the second cell during the transition period; and
discontinuing communication with the set of one or more scheduled entities in the first cell after the transition period.

2. The method of claim 1, further comprising:
transmitting a first synchronization signal block (SSB) in the first cell and a second SSB in the second cell during the transition period, wherein the first SSB and the second SSB are separated in at least one of a time domain, a frequency domain, or a code domain.

3. The method of claim 1, further comprising:
allocating orthogonal resources between the first cell and the second cell for communication with the set of one or more scheduled entities during the transition period.

4. The method of claim 3, further comprising:
utilizing a physical random access channel (PRACH) configuration of the first cell in the second cell during the transition period; and
discontinuing monitoring the PRACH in the first cell upon entering the transition period.

5. The method of claim 1, further comprising:
utilizing a first power level for communicating in the first cell and a second power level for communicating in the second cell during the transition period, wherein the second power level is greater than the first power level.

6. The method of claim 1, further comprising:
transmitting a second message comprising a soft PCI change request to the centralized network node.

7. The method of claim 1, wherein the scheduling entity comprises an integrated-access-backhaul (IAB) node and the centralized network node comprises an IAB donor node central unit, a network entity configured for PCI management, or a base station comprising a first coverage area greater than a second coverage area of the scheduling entity.

8. The method of claim 1, wherein the transferring the at least one scheduled entity of the set of one or more scheduled entities further comprises:
performing a handover of a radio resource control (RRC)-connected scheduled entity of the set of one or more scheduled entities from the first cell to the second cell during the transition period.

9. The method of claim 8, wherein the performing the handover further comprises:
configuring one or more cell measurements for the RRC-connected scheduled entity of the second cell.

10. The method of claim 9, wherein the configuring the one or more cell measurements further comprises:
including the second cell in a list of cells to be measured; and
providing the list of cells to be measured to the RRC-connected scheduled entity.

11. The method of claim 8, further comprising:
allocating resources for transmission of a reference signal in the second cell, wherein the resources comprise a beam direction corresponding to a latest serving beam direction utilized in the first cell for the RRC-connected scheduled entity;
transmitting the reference signal in the second cell; and
receiving a handover report from the RRC-connected scheduled entity based on the reference signal.

12. The method of claim 11, wherein the handover report comprises the second PCI of the second cell, an index of the reference signal, and a measurement value associated with the reference signal.

13. The method of claim 8, wherein the performing the handover further comprises:
transmitting a handover command to the RRC-scheduled entity without at least one of configuration of handover measurements or receipt of a handover report.

14. The method of claim 13, wherein the handover command comprises dedicated physical random access channel (PRACH) resources for the RRC-connected scheduled entity to utilize in performing a RACH procedure with the second cell, wherein the PRACH resources comprise a beam direction corresponding to a latest serving beam direction utilized in the first cell for communication with the RRC-connected scheduled entity.

15. The method of claim 1, wherein the transferring the at least one scheduled entity of the set of one or more scheduled entities further comprises:
updating system information with a cell bar indication for the first cell;
paging a camped scheduled entity of the set of one or more scheduled entities camped onto the first cell to notify the camped scheduled entity of a change in the system information; and
transmitting the system information to the camped scheduled entity to enable the camped scheduled entity to select and camp onto the second cell.

16. The method of claim 1, wherein the transition period comprises a predetermined duration of time or a variable duration of time within which the at least one scheduled entity of the set of one or more scheduled entities is transferred from the first cell to the second cell.

17. A scheduling entity within a wireless communication network, comprising:
a transceiver;
a memory; and
a processor communicatively coupled to the transceiver and the memory, the processor and the memory configured to:
communicate with a set of one or more scheduled entities utilizing a first physical cell identifier (PCI) of a first cell served by the scheduling entity via the transceiver;
receive from a centralized network node a first message comprising a soft PCI change indication to change from utilizing the first PCI of the first cell to utilizing a second PCI of a second cell served by the scheduling entity over a transition period, wherein the first cell and the second cell are co-located;
transfer the set of one or more scheduled entities to the second cell during the transition period; and
discontinue communication with the set of one or more scheduled entities in the first cell after the transition period.

18. The scheduling entity of claim 17, wherein the processor and the memory are further configured to:
transmit a first synchronization signal block (SSB) in the first cell and a second SSB in the second cell during the transition period, wherein the first SSB and the second SSB are separated in at least one of a time domain, a frequency domain, or a code domain.

19. The scheduling entity of claim 17, wherein the processor and the memory are further configured to:
allocate orthogonal resources between the first cell and the second cell for communication with the set of one or more scheduled entities during the transition period;
utilize a physical random access channel (PRACH) configuration of the first cell in the second cell during the transition period; and
discontinue monitoring the PRACH in the first cell upon entering the transition period.

20. The scheduling entity of claim 19, wherein the processor and the memory are further configured to:
utilize a first power level for communicating in the first cell and a second power level for communicating in the second cell during the transition period, wherein the second power level is greater than the first power level.

21. The scheduling entity of claim 17, wherein the processor and the memory are further configured to:
transmit a second message comprising a soft PCI change request to the centralized network node.

22. The scheduling entity of claim 17, wherein the scheduling entity comprises an integrated-access-backhaul (IAB) node and the centralized network node comprises an IAB donor node central unit, a network entity configured for PCI management, or a base station comprising a first coverage area greater than a second coverage area of the scheduling entity.

23. The scheduling entity of claim 17, wherein the processor and the memory are further configured to:
perform a handover of a radio resource control (RRC)-connected scheduled entity of the set of one or more scheduled entities from the first cell to the second cell during the transition period.

24. The scheduling entity of claim 23, wherein the processor and the memory are further configured to:
allocate resources for transmission of a reference signal in the second cell, wherein the resources comprise a beam direction corresponding to a latest serving beam direction utilized in the first cell for the RRC-connected scheduled entity;
transmit the reference signal in the second cell; and
receive a handover report from the RRC-connected scheduled entity based on the reference signal.

25. The scheduling entity of claim 17, wherein the processor and the memory are further configured to:
update system information with a cell bar indication for the first cell;
page a camped scheduled entity of the set of one or more scheduled entities camped onto the first cell to notify the camped scheduled entity of a change in the system information; and
transmit the system information to the camped scheduled entity to enable the camped scheduled entity to select and camp onto the second cell.

26. A scheduling entity within a wireless communication network, comprising:
means for communicating with a set of one or more scheduled entities utilizing a first physical cell identifier (PCI) of a first cell served by the scheduling entity;
means for receiving from a centralized network node a first message comprising a soft PCI change indication to change from utilizing the first PCI of the first cell to utilizing a second PCI of a second cell served by the scheduling entity over a transition period, wherein the first cell and the second cell are co-located;
means for transferring at least one scheduled entity of the set of one or more scheduled entities to the second cell during the transition period; and
means for discontinuing communication with the set of one or more scheduled entities in the first cell after the transition period.

27. The scheduling entity of claim 26, further comprising:
means for transmitting a first synchronization signal block (SSB) in the first cell and a second SSB in the second cell during the transition period, wherein the first SSB and the second SSB are separated in at least one of a time domain, a frequency domain, or a code domain.

28. The scheduling entity of claim 26, further comprising:
means for allocating orthogonal resources between the first cell and the second cell for communication with the set of one or more scheduled entities during the transition period;
means for utilizing a physical random access channel (PRACH) configuration of the first cell in the second cell during the transition period; and
means for discontinuing monitoring the PRACH in the first cell upon entering the transition period.

* * * * *